(12) United States Patent
Rasche

(10) Patent No.: US 10,902,366 B2
(45) Date of Patent: Jan. 26, 2021

(54) VISUALIZATION FEATURES FOR TEAMS

(71) Applicant: Rolls-Royce Corporation, Indianapolis, IN (US)

(72) Inventor: Joseph A. Rasche, Zionsville, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 433 days.

(21) Appl. No.: 15/909,042

(22) Filed: Mar. 1, 2018

(65) Prior Publication Data
US 2018/0253675 A1    Sep. 6, 2018

Related U.S. Application Data

(60) Provisional application No. 62/465,475, filed on Mar. 1, 2017.

(51) Int. Cl.
*G06Q 10/06* (2012.01)
*G06Q 10/10* (2012.01)

(52) U.S. Cl.
CPC ... *G06Q 10/06315* (2013.01); *G06Q 10/0631* (2013.01); *G06Q 10/103* (2013.01)

(58) Field of Classification Search
CPC .......... G06Q 10/06315; G06Q 10/103; G06Q 10/0631
See application file for complete search history.

(56) References Cited

U.S. PATENT DOCUMENTS

| | | |
|---|---|---|
| 5,793,365 A | 8/1998 | Tang et al. |
| 6,675,197 B1 | 1/2004 | Satoh et al. |
| 6,708,201 B1 | 3/2004 | Chesley |
| 6,760,748 B1 | 7/2004 | Hakim |
| 7,107,268 B1 | 9/2006 | Zawadzki et al. |
| 7,240,826 B2 | 7/2007 | Abecassis et al. |
| 7,299,257 B2 | 11/2007 | Boyer et al. |
| 7,315,985 B1 | 1/2008 | Gauvin et al. |
| 7,469,384 B2 | 12/2008 | Thompson et al. |
| 7,620,902 B2 | 11/2009 | Manion et al. |
| 7,685,016 B2 | 3/2010 | Flores et al. |
| 7,702,728 B2 | 4/2010 | Zaner et al. |
| 7,749,084 B2 | 7/2010 | Reville et al. |
| 7,761,549 B2 | 7/2010 | Farnham et al. |
| 7,765,105 B2 | 7/2010 | Mo |
| 7,788,587 B2 | 8/2010 | Michelman |
| 7,904,556 B2 | 3/2011 | Rymon |
| 8,190,620 B2 | 5/2012 | Dumant et al. |
| 8,250,150 B2 | 8/2012 | Beck et al. |
| 8,255,818 B2 | 8/2012 | Bales et al. |
| 8,306,843 B1 | 11/2012 | Price et al. |

(Continued)

*Primary Examiner* — Andrey Belousov
(74) *Attorney, Agent, or Firm* — Brinks Gilson & Lione

(57) ABSTRACT

A Business Data Portal ("BDP") may be provided. The BDP may be a team centric portal that directs users to teams that are created to complete some task or set of tasks for a company or a company's supply chain. The tools provided in each team in the BDP may facilitate members associated with the teams to perform a variety of tasks such as, but not limited to: collect, document, discuss, link, share and discover data across an enterprise or community. The team may contain data and stored knowledge used over the life of the team. The attributes and stored data, discussions, and forums may capture knowledge of the team as the BDP operates.

15 Claims, 34 Drawing Sheets

(56) References Cited

U.S. PATENT DOCUMENTS

| | | | |
|---|---|---|---|
| 8,352,874 | B2 | 1/2013 | Zaner et al. |
| 8,380,716 | B2 | 2/2013 | Mirus |
| 8,464,161 | B2 | 6/2013 | Giles et al. |
| 8,578,326 | B2 | 11/2013 | Tseng et al. |
| 8,631,021 | B2 | 1/2014 | Palmer et al. |
| 8,631,504 | B2 | 1/2014 | Joshi et al. |
| 8,639,756 | B2 | 1/2014 | Boström et al. |
| 8,707,246 | B2 | 4/2014 | Chen et al. |
| 8,719,066 | B2 | 5/2014 | Cartwright |
| 8,725,796 | B2 | 5/2014 | Serena |
| 8,739,113 | B2 | 5/2014 | Packibier et al. |
| 8,810,576 | B2 | 8/2014 | Duplessis et al. |
| 8,890,926 | B2 | 11/2014 | Tandon et al. |
| 8,937,618 | B2 | 1/2015 | Erez et al. |
| 8,972,899 | B2 | 3/2015 | Carlsson et al. |
| 8,990,393 | B2 | 3/2015 | Rizk |
| 9,021,359 | B2 | 4/2015 | Michelman |
| 9,071,509 | B2 | 6/2015 | Mallet et al. |
| 9,076,125 | B2 | 7/2015 | Manolescu et al. |
| 9,092,122 | B2 | 7/2015 | Husoy et al. |
| 9,092,744 | B2 | 7/2015 | Tito |
| 9,177,041 | B2 * | 11/2015 | Jackson, Jr. ......... G06T 11/206 |
| 9,189,756 | B2 | 11/2015 | Gilbert et al. |
| 9,262,058 | B2 | 2/2016 | Mubarek et al. |
| 9,277,028 | B2 | 3/2016 | Ebner et al. |
| 9,280,566 | B2 | 3/2016 | Versteeg et al. |
| 9,344,520 | B2 | 5/2016 | Griffin |
| 9,411,490 | B2 | 8/2016 | Van Wie et al. |
| 9,438,650 | B2 | 9/2016 | Serena |
| 9,443,228 | B2 | 9/2016 | Eidelson et al. |
| 9,477,374 | B1 | 10/2016 | Snabl |
| 2003/0046095 | A1 | 3/2003 | Jessop et al. |
| 2007/0129976 | A1 * | 6/2007 | Hochberg ............ G06Q 10/063 705/7.12 |
| 2007/0282657 | A1 | 12/2007 | Hupfer et al. |
| 2009/0006427 | A1 | 1/2009 | Veeraraghavan et al. |
| 2012/0166534 | A1 | 6/2012 | Bentley et al. |
| 2012/0317501 | A1 | 12/2012 | Milou |
| 2013/0155068 | A1 | 6/2013 | Bier et al. |
| 2013/0205215 | A1 | 8/2013 | Dunn et al. |
| 2013/0254305 | A1 | 9/2013 | Cheng et al. |
| 2014/0136436 | A1 | 5/2014 | Palmer et al. |
| 2014/0236849 | A1 | 8/2014 | Flammer et al. |
| 2014/0244325 | A1 | 8/2014 | Cartwright |
| 2014/0282219 | A1 | 9/2014 | Haddock |
| 2014/0365389 | A1 | 12/2014 | Cheek et al. |
| 2015/0006515 | A1 | 1/2015 | Hopkins |
| 2015/0012298 | A1 | 1/2015 | Ash et al. |
| 2015/0026120 | A1 | 1/2015 | Chrapko et al. |
| 2015/0154281 | A1 | 6/2015 | Carlsson et al. |
| 2016/0004741 | A1 | 1/2016 | Johnson et al. |
| 2016/0036872 | A1 | 2/2016 | Lappin |
| 2016/0098668 | A1 | 4/2016 | Hojby et al. |
| 2016/0212377 | A1 | 7/2016 | Griffin |
| 2016/0224205 | A1 | 8/2016 | Fulton |
| 2016/0239768 | A1 | 8/2016 | Jones |
| 2016/0246452 | A1 | 8/2016 | Bockhold et al. |
| 2016/0260063 | A1 | 9/2016 | Harris et al. |
| 2016/0292247 | A1 | 10/2016 | Kaufman |
| 2016/0343005 | A1 | 11/2016 | Liu et al. |

\* cited by examiner

| Projects | RRC Workshop | Datasets | | | |
|---|---|---|---|---|---|

Small_dummy Data

PROPERTIES

| Template | RR10 |
|---|---|
| Size | 54.12 MB |

HEADER

| Alloy | IN718 |
|---|---|
| Analysed by | A Powell |
| Data Classification | good |
| Data owner | Joe Rasche |
| Data Ownership (Other) | Tim Cummings |
| Data added to database | 2015-04-30 00:00:00 |
| Export Controlled | |
| Funding Organization | MAI |
| Heat Number | 12.0 |
| IP Controlled | |
| IP Restriction | no |
| Jurisdiction and Classification | standards |
| Material Form | B |

DATASETS
+ New Dataset
≡ Browse Datasets
≡ Deleted Datasets

TEMPLATES
+ New Template
≡ Browse Templates
≡ Deleted Templates

ARCHIVE LOGS
☐ Access Log

DATASET
⊙ View
↓ Download (54.12 MB)

LINK BIN

HELP DESK

FIG. 13

| DATA SUMMARY | |
|---|---|
| 0.2% Offset yield stress | No data was found |
| Alpha lath thickness | 14 found |
| Aluminum (Al) | 14 found |
| Beta transus temperature | 14 found |
| Elongation | No data was found |
| Intercept length primary alpha grain | 14 found |
| Intercept length primary alpha particle | 14 found |
| Iron (Fe) | 14 found |
| Kearns number (ND) | 14 found |
| Kearns number (RD) | 14 found |
| Kearns number (TD) | 14 found |
| Oxygen (O) | 14 found |
| Reduction in Area | No data was found |
| Solution Temperature | 14 found |
| Specimen ID | 14 found |
| Test House Specimen ID | 14 found |
| Test volume fraction of alpha (if available) | 14 found |
| Ultimate tensile strength | No data was found |
| Vanadium (V) | 14 found |
| Volume fraction primary alpha | 14 found |

| | A | B | C | D | E | F |
|---|---|---|---|---|---|---|
| 24 | Requested_by | STXT | | Results | | Requested_by |
| 25 | Series ID | STXT | | Results | | Series_ID |
| 26 | Specimen ID | STXT | | Results | Row | Specimen_ID |
| 27 | Specimen Location | STXT | | Results | Row | Specimen_Location |
| 28 | Specimen notes | STXT | | Results | Row | Specimen_notes |
| 29 | Storage condition (other) | STXT | | Results | | Storage_condition_other |
| 30 | Strain measurement (other) | STXT | | Results | | Strain_measurement_other |
| 31 | Surface finish (other) | STXT | | Results | Row | Surface_finish_other |

Results / Parameter Lookup / Attribute Lookup / Tensile

VISUALIZATION FEATURES FOR TEAMS

This application is a non-provisional application of, and claims priority under 35 USC § 119(e) to, U.S. provisional application 62/465,475, filed Mar. 1, 2017, the entire contents of which are incorporated by reference.

GOVERNMENT LICENSE RIGHTS

This invention was made with government support under prime contract FA8650-06-2-5211, subcontract FA8650-14-2-5203 (PW-11), awarded by the Air Force Research Laboratory (AFRL) Materials Affordability Initiative (MAI) consortium. The government has certain rights in the invention.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

FIG. 5 is an example interface of an Example Attribute List team, configured to land on a Docs page;

FIG. 6 is an example interface of a Team Attribute List attribute tool showing a list of registered templates;

FIG. 7 is an example interface of a community registered attribute list with an example version shown;

FIG. 12 is an example of an Archive data set named Small_dummy data;

FIG. 13 is an example of a header of an Archive data set named Small_dummy data;

FIG. 14 is an example of a data summary page, specifically for Small_dummy data;

FIG. 15 is an example of a browse and compare specimens page with a highlighted specimen;

FIG. 21 is an example of an Attribute Lookup sheet showing the cell name and attribute reference mechanism;

DETAILED DESCRIPTION

Portal communication is a way for entities to communicate to others. A company, for example, may have a desire to link projects with other organizations or teams in a centralized portal for, among other things, monitoring progress of projects, convenience in posting new projects or tasks, and/or utilizing a central depository for completed work or work-in-progress. A team centric portal may direct users to teams that are created to complete some task or set of tasks for a company or a company's supply chain.

In today's market, there is a gap in crowd sourcing and collaboration portals. Across the supply chain, at every level of business, data is collected in spreadsheets to handle information and calculations at hand. On the other hand, purchased software typically only works where processes are known, the attributes are known to or predetermined by the purchased software, and the internal workflow is pre-established. Between the spreadsheet data collection and the purchased software business workflows, there is a missing business component.

Most businesses are still following mainframe thinking where everything has to be predetermined and agreed to before business collaboration, data exchange and workflows are established. A Business Data Portal ("BDP") described herein collects up, from any community of supply chain collaborators, their attributes of interest on the fly. As a result, rapid collaboration and communication may start immediately and grow as needed.

A two dimensional (2D) or three dimensional (3D) visualization tool offered in the BDP is a new and unique feature for understanding teams, their connections to other teams and their large data sets in a visual fashion for quick understanding of who has access to a team, what data has been stored, and what has been shared with other teams. The visualization tool shows teams and how their information is shared, who is on what team, a connection of data and/or teams and orchestrates the ability for rapid collaborating and communication between teams and team members in a community. The visualization tool enables humans to understand the connections of data and people over vast communities, interlinking with other 2D or 3D virtual tools.

The visualization tool may allow the user to see teams he and/or she belongs to, as well as who is on the other teams. By displaying faces of the users, it is easier for people to recognize the people attached to the users. In addition, the displayed faces provide an easy mechanism for a user to click on the displayed face and start a conversation with the user associated with the displayed face. The visualization tool allows for graphical navigation of the user's teams to quickly check in with the teams he/she belongs to or owns. The user may quickly graphically check which data is being shared from his/her teams and to his/her teams.

Figure 10:
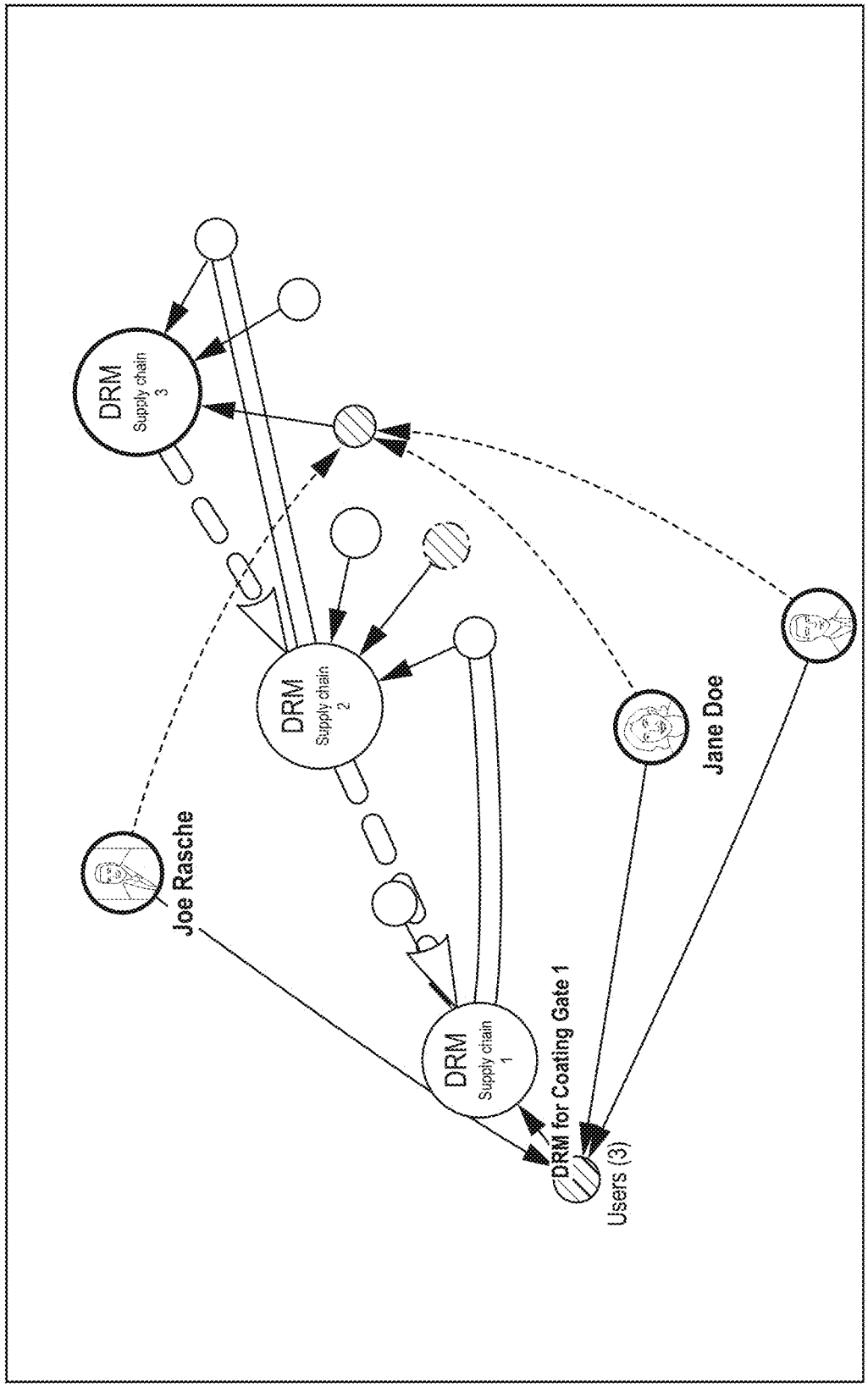
FIG. 10 is an example of a Graphical View of a team make-up.

The portal may show a team's files, users, archive data, connections, and the shared data between teams in a graphical form. Each team controls their data and the sharing of their data. FIG. 10 illustrates an example of the visualization tool in which a Gated DRM release process (a supply workflow gated process) extends across a given supply chain. In the illustrated example, three team icons are shown corresponding to a DRM supply chain 1 team, a DRM supply chain 2 team and a DRM supply chain 3 team. The DRM supply chain 1 team is at a beginning of the supply workflow gated process. Other teams, for example, the DRM supply chain 2 and the DRM supply chain 3, are sub-teams, indicated by a relatively large dashed arrow graphic. The dashed arrow between teams visually indicates that a child team is a member (in other words, a sub-team) of a parent team because the arrow points from the child team to the parent team.

By way of an introductory example, a Business Data Portal ("BDP") is a team centric portal that directs users to teams that are created to complete a task or a set of tasks for the company or the company's supply chain. The tools provided in each team in the BDP may allow a collective of members associated with the teams to perform a variety of tasks such as, but not limited to: collect, document, discuss, link, share and discover data across an enterprise or community. The team may have data and stored knowledge used over the life of the team. For example, attributes and stored data, discussions, and forums may capture the knowledge of the team as the team does its work. The captured data in the team and the attributes may allow for incremental growth in company processes, completed work, reuse of successful team efforts and linkage of company data across the corporation and supply chain.

Attributes may be information that determines the properties of a field or tag in a database. For example, an attribute may include a name and a data type. Examples of the data type may include, for example, integer, string, and float. Data inserted into the database may be inserted into fields in the database that are determined or defined by the attributes.

One interesting feature of the systems and methods described below may be that numerous teams may be made up and populated by a vast community of users, internal and/or external to a company, in a very short period of time. Teams may, for example, share data with other teams, link sub teams to parent teams to show workflow, to break up the work across a supply chain, and to segregate the data per team so that each team controls its respective data. Workflows may be graphically reviewed and approved. Because the faces of the users may be displayed, and because team icons may be shown representing the different parts of the supply chain, it is easy to review and audit the workflow using the Graphical view window.

Another interesting feature of the systems and methods described below may be that at least the team centric approach, coupled with the graphical view tool, is unique to the collaboration portals on the market today and has great value for companies and/or organizations that are interested in incremental improvement in processes and shortening the collaboration time. The team centric approach, coupled with an easy to use menu system, may enable rapid crowd collaboration across a diverse community with secure data transfer and sharing of data.

Another interesting feature of the systems and methods described below may be that at least the team centric approach and the easy to use menus may allow large and small companies to create a company team in the BDP, thus leveling the field and enabling crowd sourcing over a large population. The time savings in eliminating the user individual filing of emails, data on local drives, data on internal databases and tracking the emails and local folders may be significant. All of the data and communication is stored in the team at a centralized storage location so individual local filing efforts are eliminated.

Another interesting feature of the systems and methods described below may be that at least the team centric approach allows for easy visualization and understanding across a body of teams that a company or organization is undertaking.

Another interesting feature of the systems and methods described below may be that the faces of team members may be shown in, for example, a Graphical View. The display of faces of the team members may break down barriers in communication. Selecting the person's face to initiate communication reduces barriers in communication and keeps conversations linked to the team. The display of team members' faces also make for quick understanding of who is part of the team, replacing reading lists of names, which may be fatiguing and tiresome for some people.

Another interesting feature of the systems and methods described below may be that at least the team centric approach offered by the BDP is a new feature that enables incremental growth in knowledge and processes by capturing the teams' efforts over the duration of their tasks. Captured knowledge and processes may be very valuable to companies and are not available in other portals on a team basis.

Figure 1:
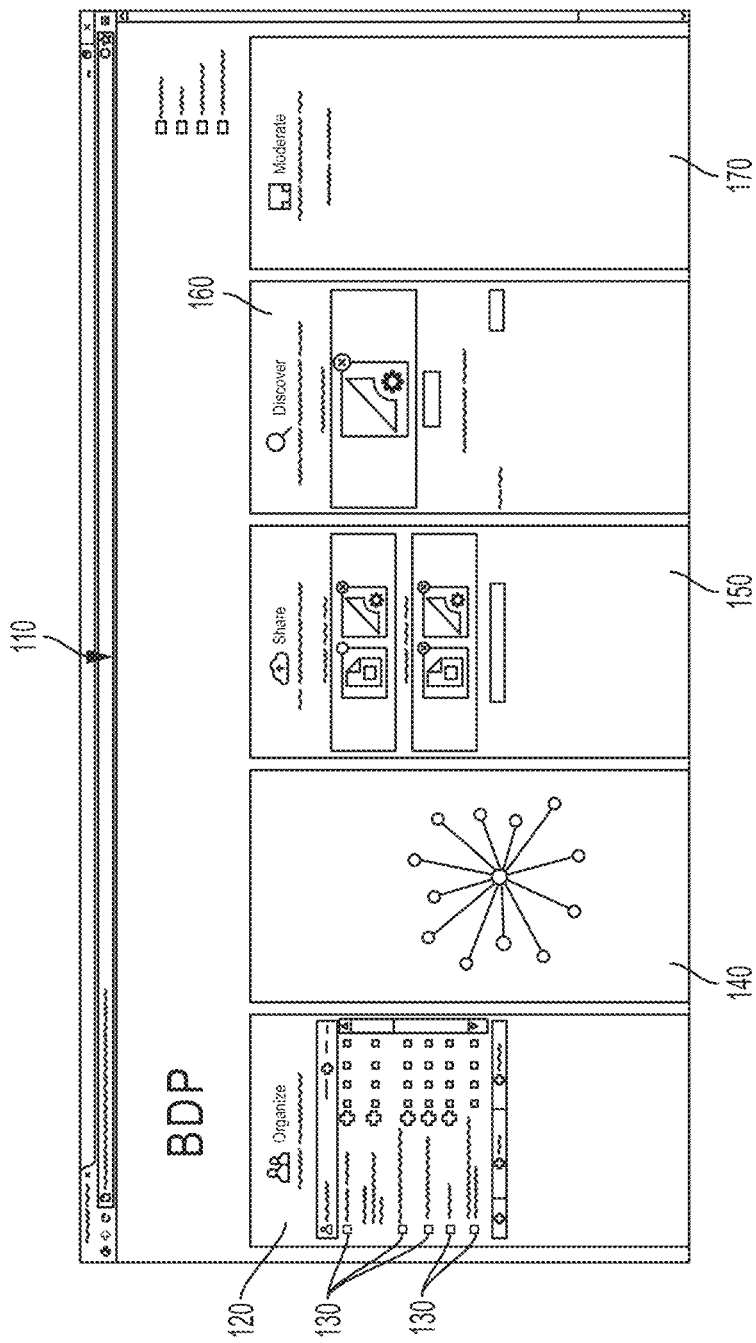
FIG. 1 is an example interface of a user's dashboard that includes a moderator panel.

FIG. 1 is an example graphical user interface comprising a user's dashboard 110 with a moderator panel 170 shown. An Organization panel 120 in the user's dashboard 110 is used to create a team, edit settings, and/or log into an existing team. A user may simply select (for example, touch and/or click on) the team name 130 in the Organization panel 120 to log into the team and see the team dashboard 200 (shown in FIG. 2). A Graphical View portal 140 allows the user to view teams, data, and/or connections graphically. A Share panel 150 shows the data that is shared by the user or to the user via the teams to which the user belongs. The shared data may be in the form of archives discussed later below. A Discover panel 160 facilitates filtering over attributes of a community in order to find stored data, and/or facilitates performing Boolean searches over the data that the user has access to via the teams to which the user belongs. The moderator panel 170 may be displayed when someone is requesting access to the community and has selected the moderator's affiliation (company or organization). A Moderator may vet the user requesting access to the portal and then grant or deny access accordingly. The Moderator may be a user in the community and may participate in team activities.

Figure 2:
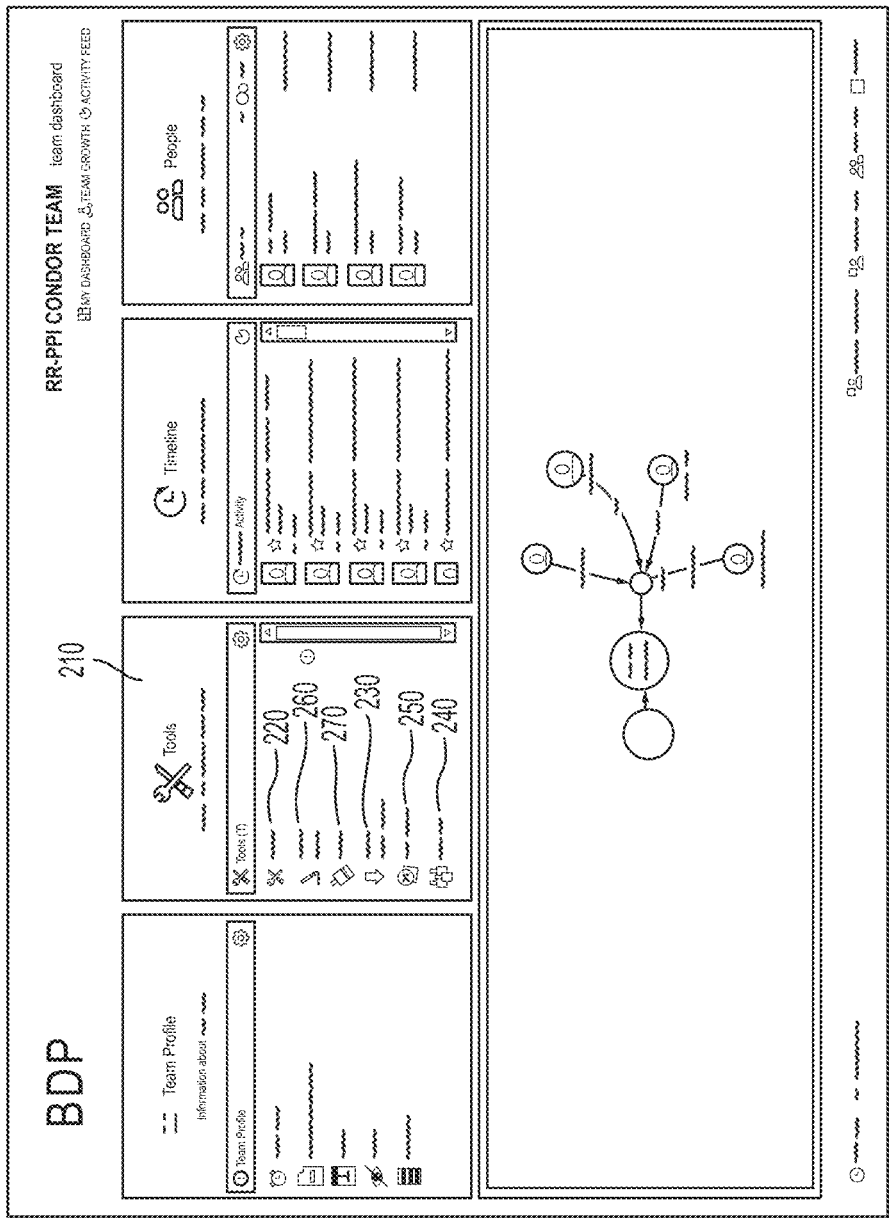
FIG. 2 is an example interface of a team dashboard.

FIG. 2 is an example interface of the team dashboard 200. The team dashboard's 200 Tools panel 210 is used to configure the team's tools. The admin tool 220 enables rapid, flexible configuration of selected tools and of team members. In this example, each team created has a default of six tools that may be used by the team. The team tools displayed are Admin 220, Files 230, Forums 240, Archive 250, Docs 260, and Manage 270. Alternatively or in addition, the team tools may include additional, fewer, or different tools than illustrated. The admin for the team manages the tools and may remove tools from the team's view. For example, the team may use only Files 230, Forums 240 and Manage 270 tools for the team's work. The names of the tools may be changed, the order that the tools appear in the menu may be changed, and the permissions for each tool may be set by an admin of the team (otherwise known as an administrator), who may also be a creator of the team. The admin also manages team member access to the team, adding and removing members as needed for the team.

The ability for the users to manage the portal teams and attributes dramatically lowers the labor cost to create a team or a community because no back office information technology support is required. An ability to clone a team set or workflow may further enhance productivity.

Figure 3A:
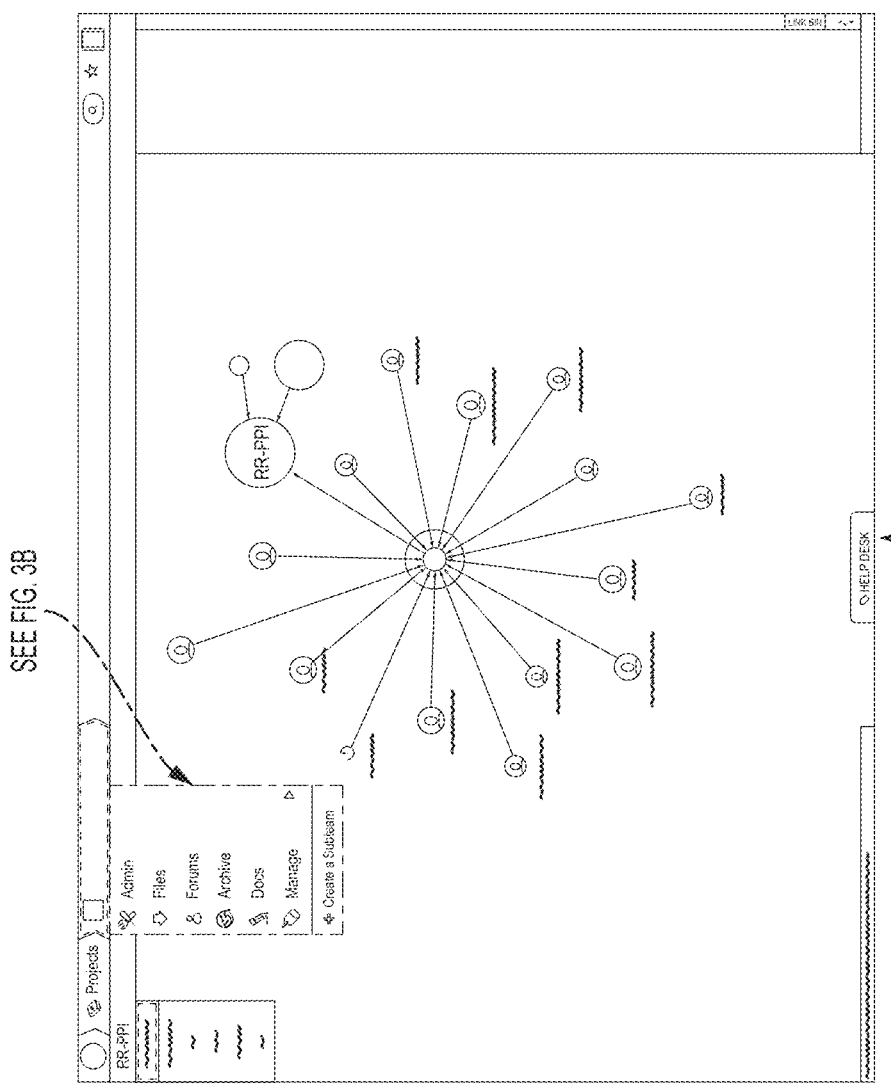
FIG. 3A is an example interface of a graphical view tool showing team membership and six example tools.
Figure 3B:
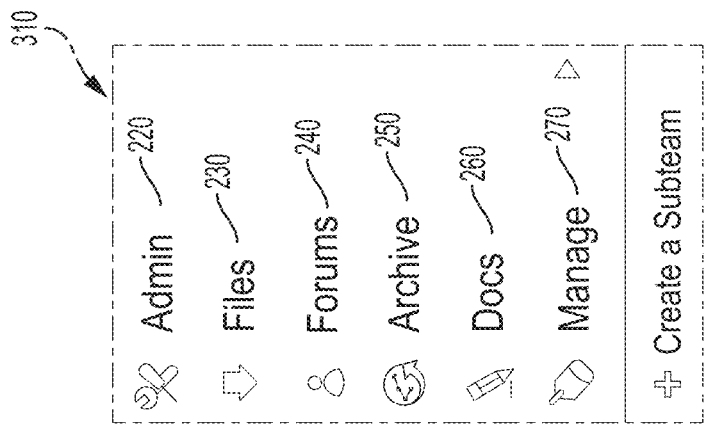
FIG. 3B shows an expanded view of the menu 310.

FIG. 3A is an example interface of a Graphical View tool 300 showing team membership and a menu 310 of six example tools: Admin 220, Files 230, Forums 240, Archive 250, Docs 260, and Manage 270. FIG. 3B shows an expanded view of the menu 310. The team tools may be accessed, for example, from the team dashboard 200 or the Graphical View tool 300 of the team. The team's connections are shown in two dimensions in FIG. 3A. Alternatively or in addition, the team's and/or the community's attributes may be used to project the team's connections and data onto two or three dimensions in order to further enhance the user's understanding of the connected data.

Figure 4:
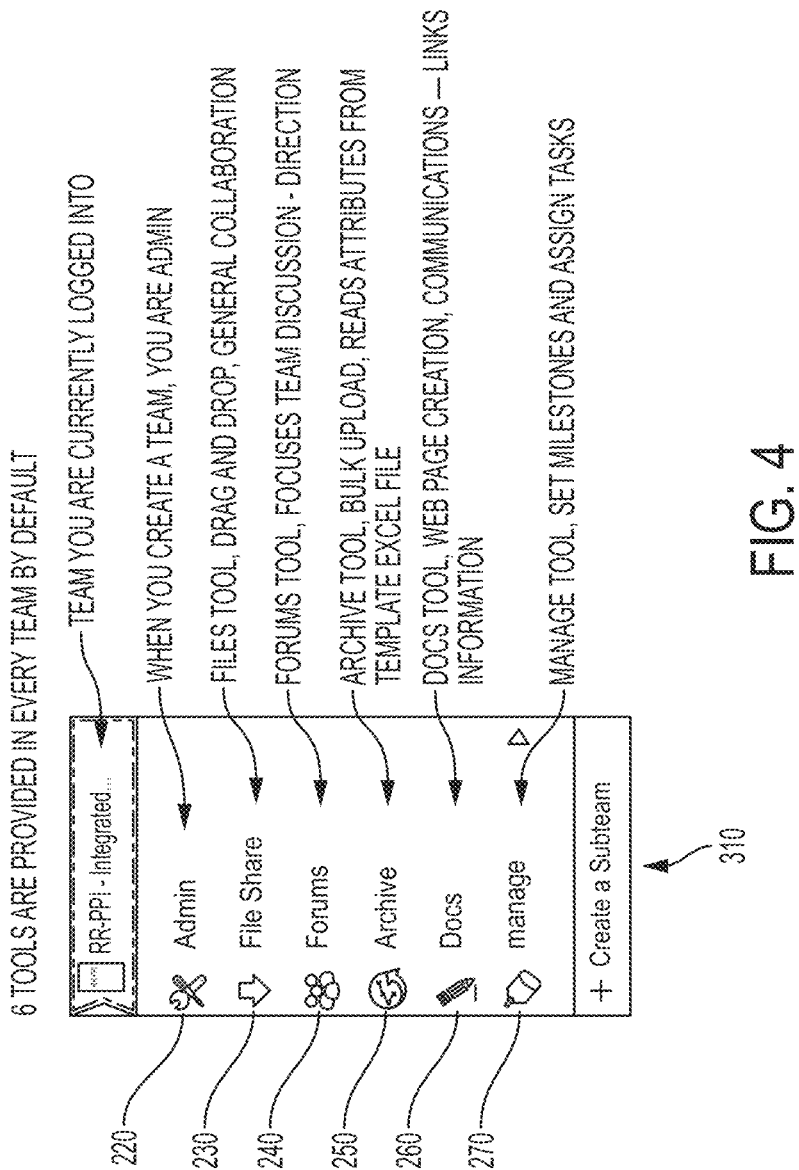
FIG. 4 is an example menu of default tool names and functions.

FIG. 4 is the menu 310 of default tool names along with text of the functions of each tool shown. The Admin 220 tool may be used by any user who is an admin. The creator of the team may be an admin and may make other members of the team an admin as well. The admins may configure the team to fit the needs of the team and the type of work at hand. The ability for the user to function as a team, configure the portal to his/her team's needs and manage the attributes through the menu system enables companies and organizations to incrementally build on each team's efforts, linking and building on the team's data and efforts so data, knowledge, information and business data may be systematically improved.

Figure 5:
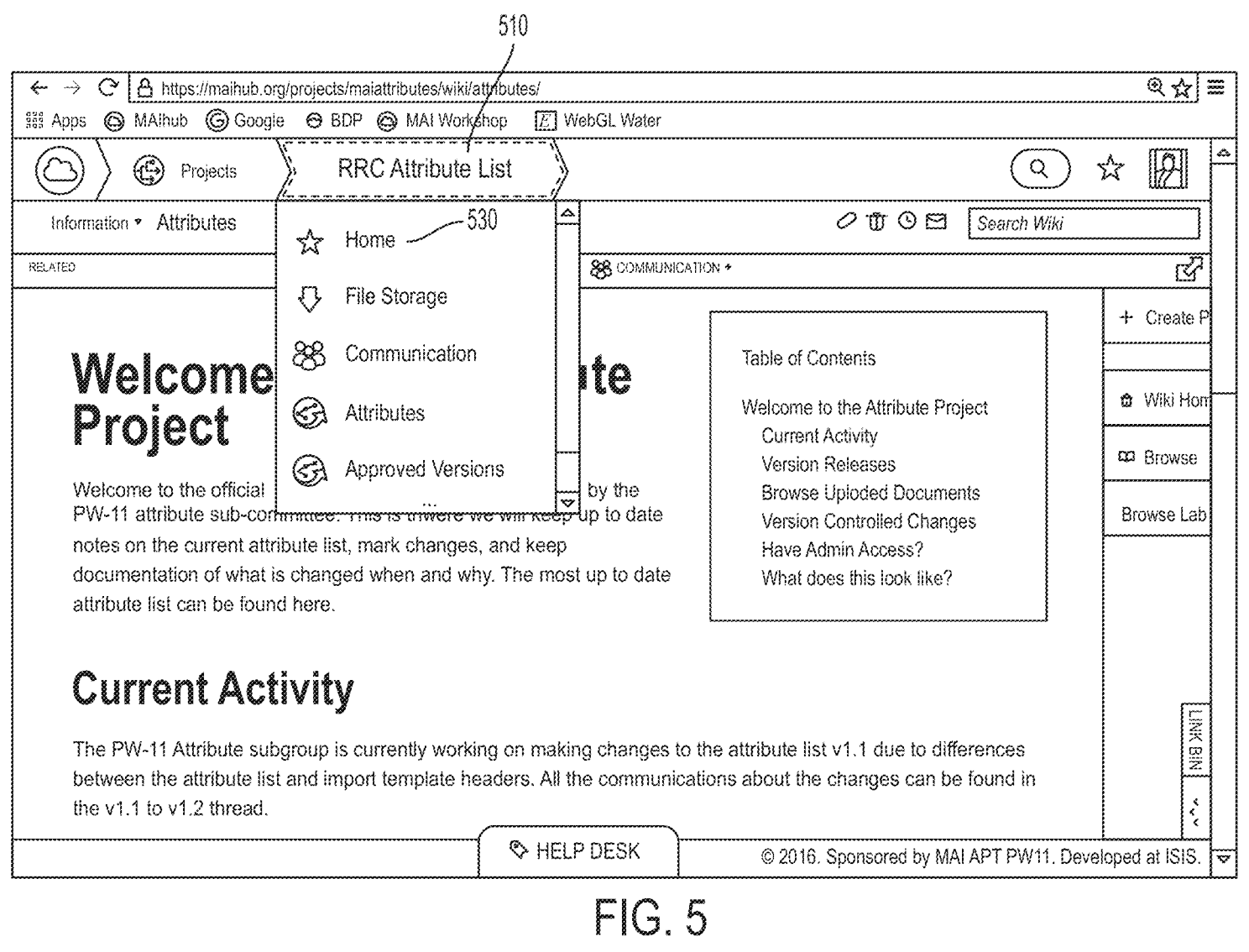

FIG. 5 is an example interface of a RRC (Rolls-Royce Corporation) Attribute List 510 team that controls the attributes for an example RRC community. The attribute control for each Business Data Portal community is handled by a predefined or a special team; the team may have, for example, the phrase "Attribute List" in the title of the team, such as the "RRC Attribute List team" 510 shown in FIG. 5. The special team is created when the community is created and may be known to everyone in the community. The special team may manage the community's attributes. The community's Attribute List 510 team manages the attribute list version and has the ability to register new attribute list with the portal. In some examples, all previous attribute list versions may be retained in the community and may be used for filtered searches with the Discover panel 160. A team landing page for the RRC Attribute List 510 team may be seen in FIG. 5, which the user may navigate to by selecting the Docs tool, named "Home" 530 in the illustrated example.

Figure 6:
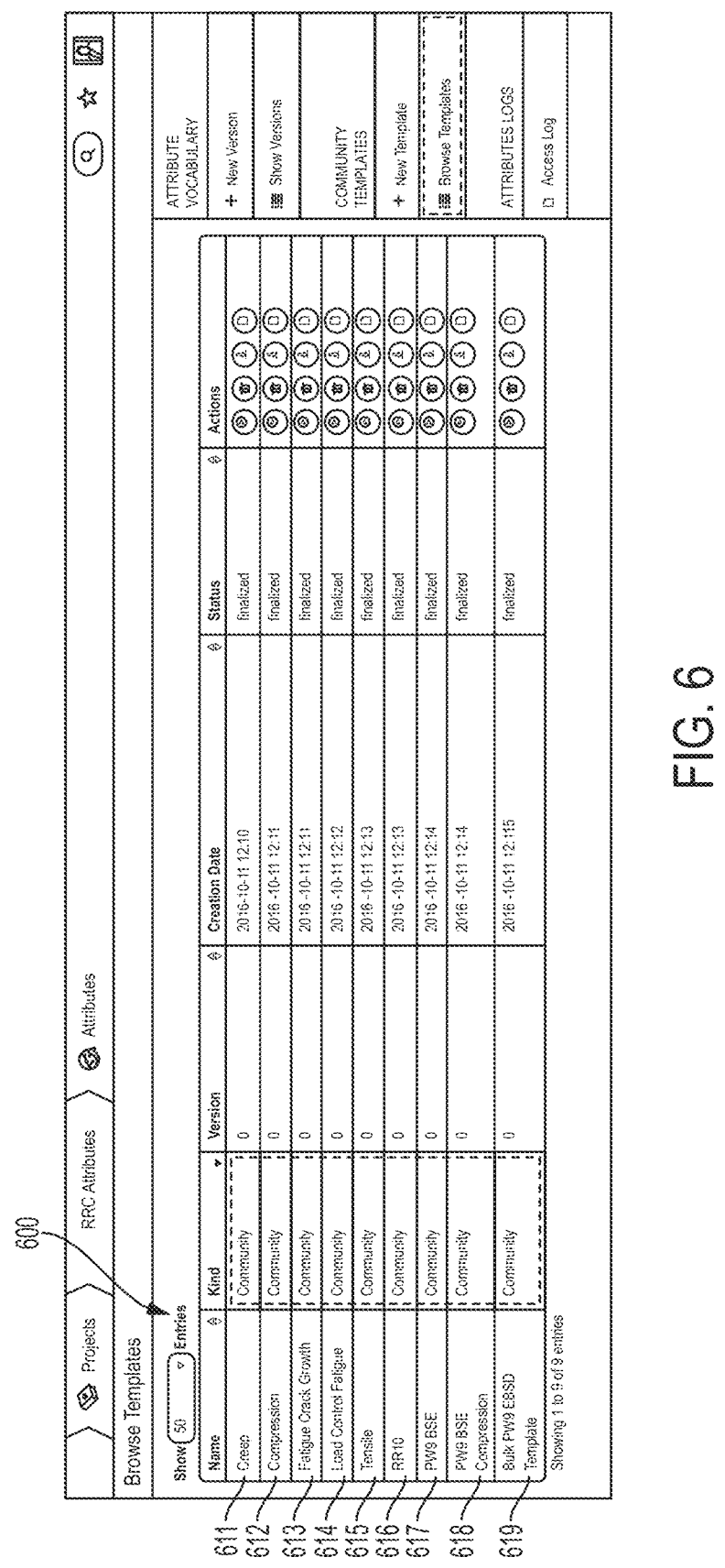

FIG. 6 is an example graphical user interface of a Team Attribute List 600 attribute tool that shows a list of registered templates 611, 612, 613, 614, 615, 616, 617, 618, and 619. The list templates may include, for each template, a name, a type of template (for example, community or team depending on whether the template is available to just the team or to a community as a whole), and a creation date. The Team Attribute List is a tool 600 that may be available to the Attribute List team.

Figure 7:
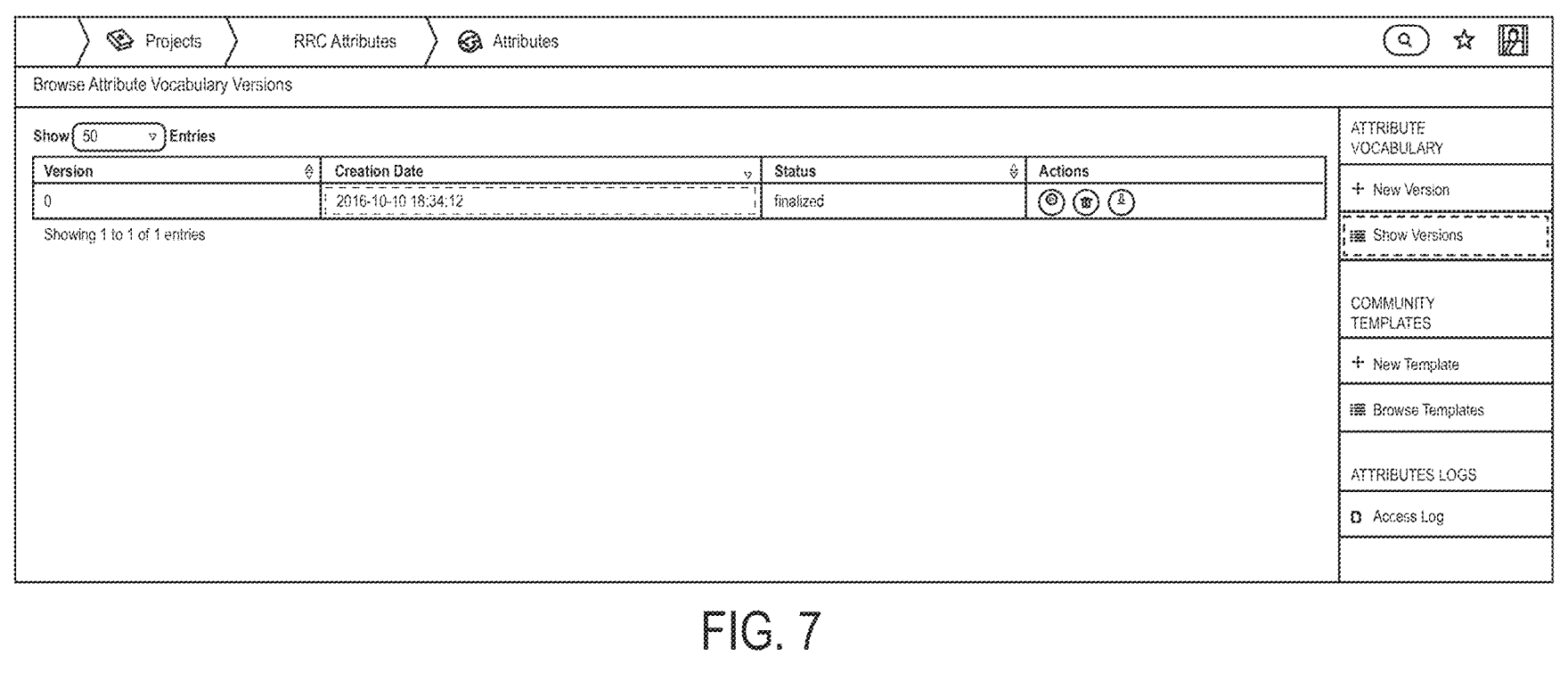

FIG. 7 is an example graphical user interface of a community registered attribute list with an example version shown. The BDP may manage multiple versions of registered attribute lists. In some examples (not shown) the community registered attribute list may include multiple sets of registered attributes, each having a corresponding version. The latest version may be the set of attributes usable by any subsequently created archives.

Figure 8:
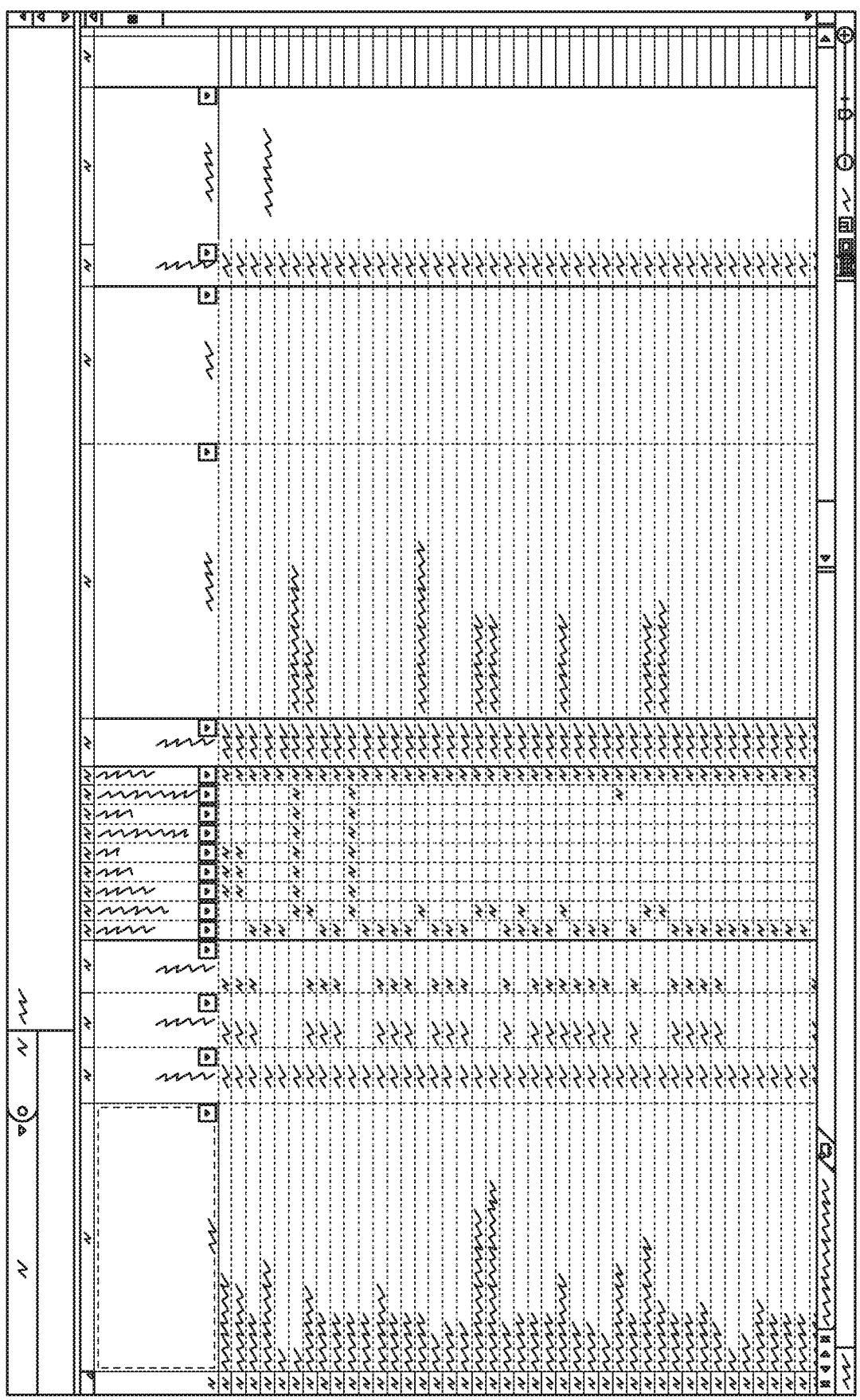
FIG. 8 is an example attribute list registration in a spreadsheet format.

FIG. 8 is an example attribute list registration in a spreadsheet format. The Business Data Portal's team centric approach coupled with user portal management tools and attribute database programming via a spreadsheet enables any crowd community to quickly assembly a team, identify the community's attributes of interest, and start collaborating. The community's attributes may be programmed, for example, by preparing a spreadsheet that identifies the attributes and corresponding attributes types, and then uploading the spreadsheet to the portal. Such a spreadsheet may be referred to herein as a "programming spreadsheet". Each attribute may have, for example, a corresponding name, a data type indicator, a row or cell type indicator.

The collaboration portals on the market today are based on threads across organizations and have a plain text menu style where everything possible is listed in front of the user. The user may be overwhelmed with the possible choices. In contrast to such examples, the business data portal menus may be comparably simpler, direct, and easier to use. The business data portal is focused on the team's effort and allows for incremental growth in data, information and knowledge based on real work at hand, exposing the attributes that are actually desired by the team and community and not just presupposed attributes that have historically been determined before collaboration started. The real big data is documented by the teams doing the work at hand during business operation. The teams do this documentation by identifying the important attributes that the team and/or community needs to get their job done. This harvested knowledge, in the form of community attributes, makes the business data portal very valuable for a business because, in the process of doing their normal work, the business may capture the important attributes used across their teams and/or supply chain. This is vastly different than anything on the market today, where data is mined or filtered to find what the individual wants. The flexible nature of the business data portal may tap into any organization's work, such as supply chain processes, and captures what the supply chain wants to track.

Figure 9:
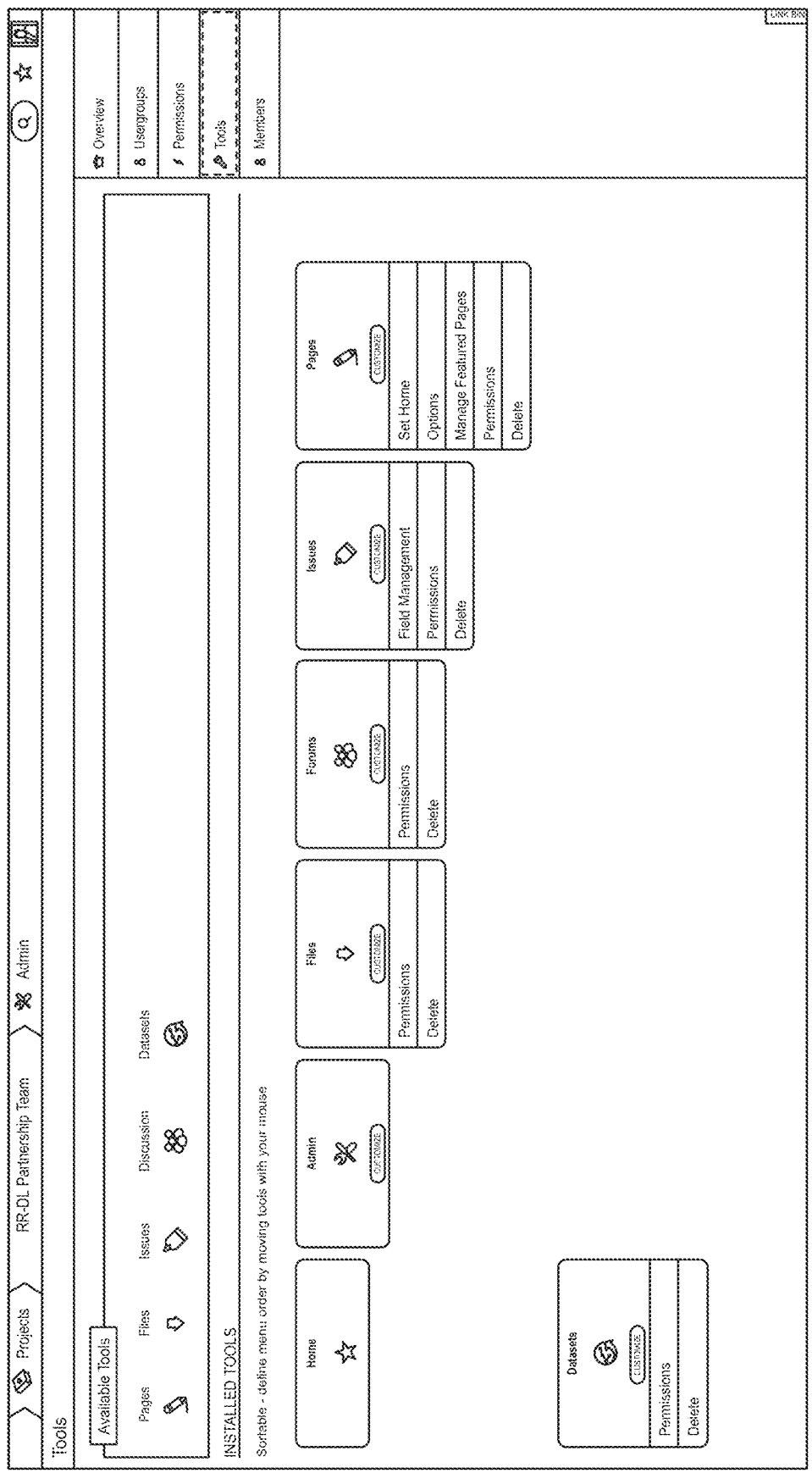
FIG. 9 is an example interface for an administrator tool for team tool configuration.

FIG. 9 is an example interface for an administrator tool for team tool configuration.

FIG. 10 is an example of a Graphical View of a team make-up. Specifically, FIG. 10 shows three teams: DRM Supply Chain 1 and sub-teams DRM Supply Chain 2 and DRM Supply Chain 3. The user may view and/or navigate the teams to which the user belongs. In addition, the user may communicate with others on the user's teams and any connected teams. This team connection enables more information to be shared across the business, reuse good data and/or information over time and incrementally improve via successive team efforts. Providing such a team centric approach also enables a company or an organization to graphically show the team's efforts and their connections to other team's efforts in the company, allowing the management to provide continuous improvement.

Figure 11:
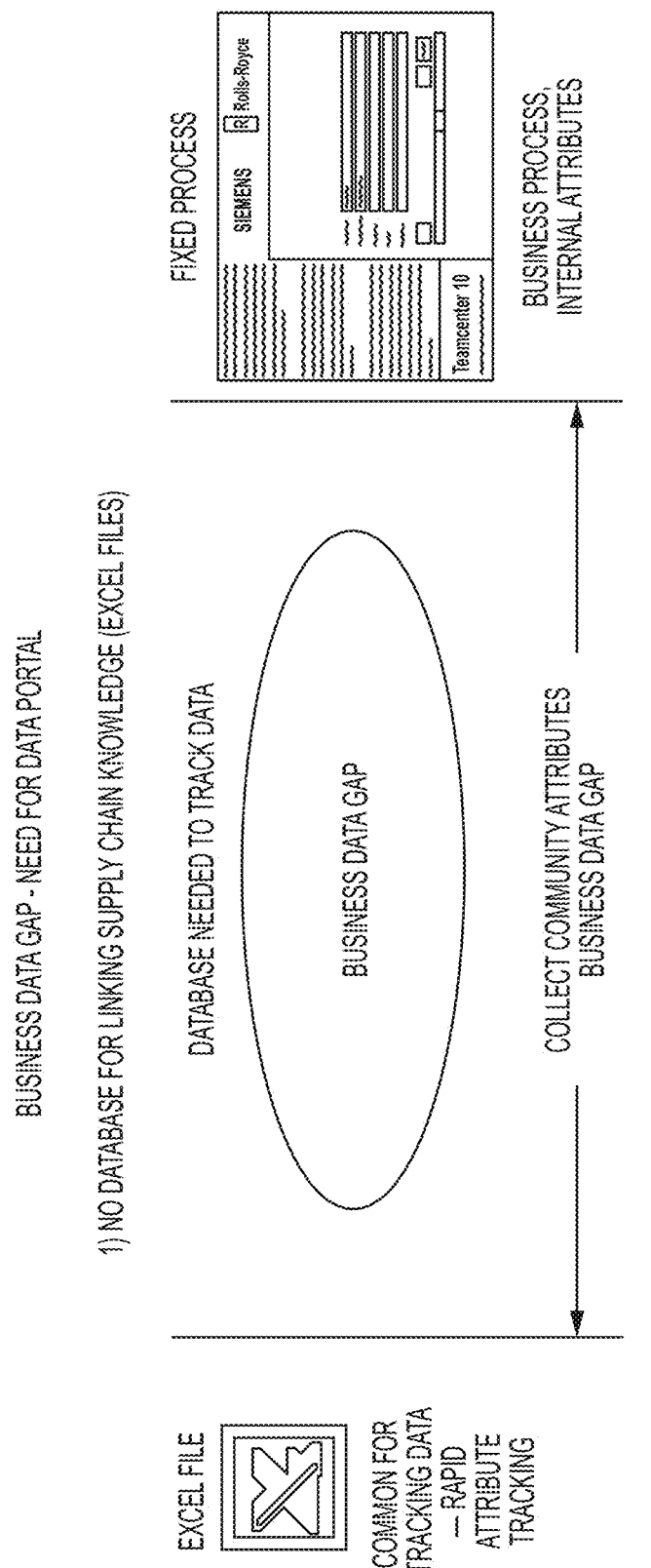
FIG. 11 illustrates a Business Data Gap.

FIG. 11 illustrates a Business Data Gap. The Business Data Gap is an untapped market, with no collaboration tools on the market today that let a team or community program their collaboration portal using a spreadsheet. In some examples of the Business Data Portal, a unique feature is to allow the users to program a portal database with existing, in use, spreadsheets, which facilitates rapid collaboration across crowd supply chain. The BDP allows the users to upload their spreadsheet into the BDP so the portal's database attributes are programmed off of the incoming spreadsheet. This easy-to-use attribute programming of the BDP's community attributes allows for rapid creation of linked data in the community. The Business Data Portal enables the community to control their attributes of interest and start collaborating immediately. The community may use a special or predetermined team in the community to manage the attributes for the community. In other words, the ability to add or modify attributes may be limited to members of the special team. As the attributes evolve from version 1 to version N, the attributes of the community for every version may be retained so information is not lost and an environment of rapid acceptance and use of attributes is enabled. For example, as attributes change, data stored using the previous version(s) of the attributes may continue to be maintained and accessible. The attribute control allows the user community to store large amounts of data in a portal database and be able to quickly find the data because the data is tied to the community's attributes. For example, searches may be conducted based on values of the community attributes.

The spreadsheet file programming may be used for community and/or team template registration. Any member of a community and/or a team is able to use a spreadsheet, which the member may otherwise commonly use in his or her internal business, as a template for upload or downloading data from their teams in the BDP. After registering attributes for a community and/or a team, for example, the Business Data Portal Archive Tool may be used by team members to archive data for their team. The Business Data Portal Archive Tool may pull attribute data from the spreadsheet uploaded by the team members when creating an archive. The attribute data may map data locations in the spreadsheet to registered attributes.

The user may register his/her spreadsheet template into the portal for attribute registration, for archive read during upload, and/or for download of shared or owned data. The spreadsheet template may identify attributes and include data values to be stored in the attributes.

The BDP enables large uploads of related data to the BDP while reading data from a provided registered spreadsheet format containing data of interest to the team and community. For example, the user may zip up large amounts of data in numerous directories and place their registered spreadsheet file at the top of the zipped directories file structure. When the zip file is uploaded to the BDP, the data in the zipped file is read into the portal database. The user may have the option to make the provided attribute information discoverable by the community. Alternatively, the attribute information may not be discoverable or viewable by members of the community that are not members of the team that owns the attribute information.

In the archive tool, the user may browse or other access the content of the zip file through the portal. If a naming convention was used in the files stored in the zip file and those conventions are referenced in the attribute registry, then the digital artifacts or files representing attributes may be viewed using the specimen option in the Archive tool. This allows for quick review of the data linked to the attached, registered, spreadsheet.

Figure 12:
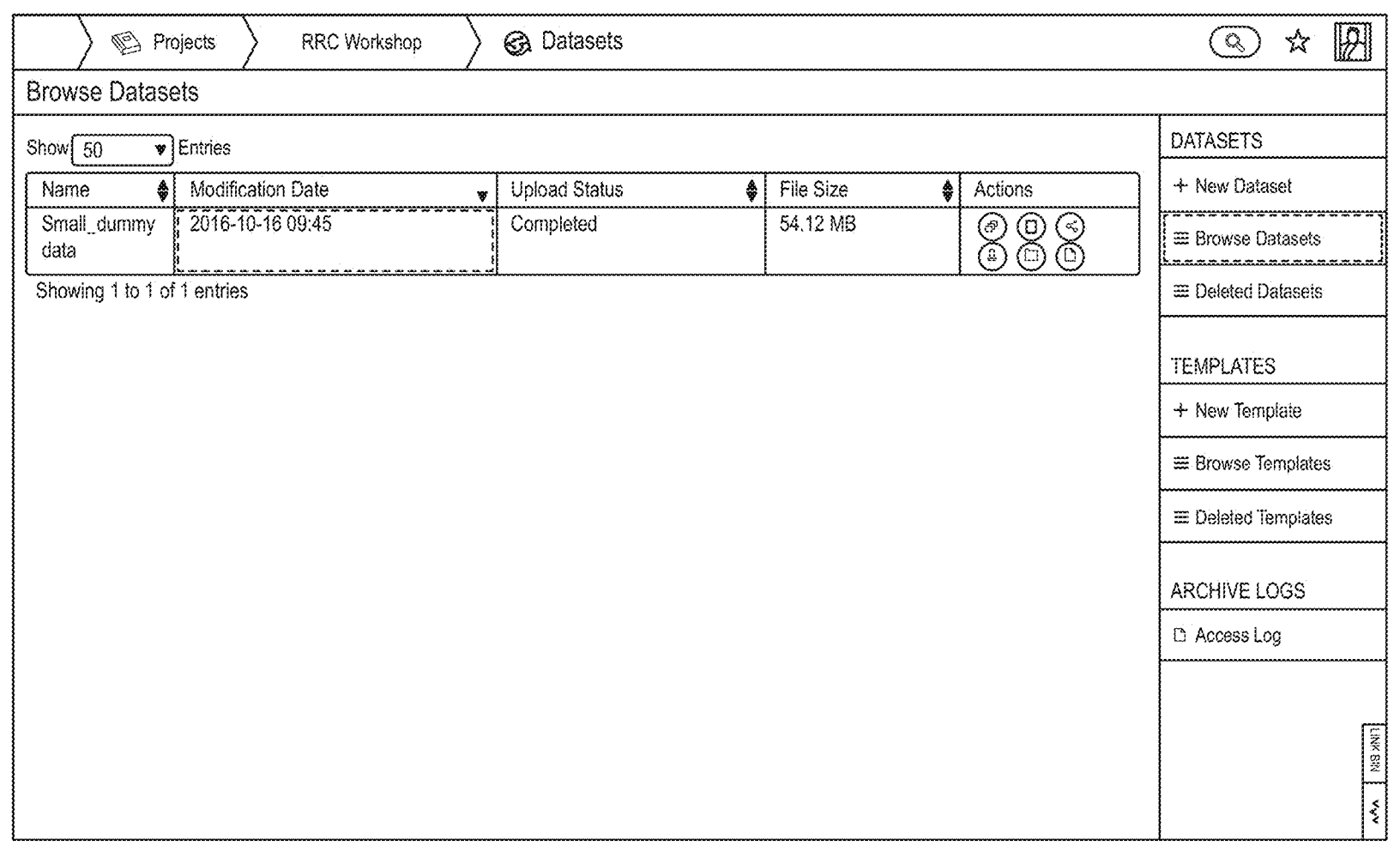

FIG. 12 is an example of a header of an archive data set named "Small_dummy data." The archive data set may have been created by the BDP in response to a user uploading a ZIP file or any other type of archive file. The archive file may be a file that includes one or more files or directories that have been compressed and/or otherwise grouped into a file.

A collection of files may be received in the archive file and content of each file may be associated with a respective row in the portal database based on a naming convention of files in the collection of files.

FIG. 13 is an example of an archive data set named "Small_dummy data." The registered attributes that may have values in the archive data set are shown, in the illustrated example, on the left-hand side of the graphical user interface. The captured data (uploaded by the user) is shown on the right-hand side in this example. For example, the registered attribute "Alloy" includes a value "IN718", which indicates a material name, extracted from the spreadsheet during the upload of the data.

FIG. 14 is an example of a data summary page, specifically for the archive data set "Small_dummy data." In the example shown in FIG. 14, the registered attribute "0.2% Offset yield stress" had no data in archive data set (or the spreadsheet that was uploaded) but the registered "Alpha lath thickness" imported 14 values from the spreadsheet for the "Alpha lath thickness" attribute. The BDP enables the user to filter through the stored data so ranges of attributes may be used to find archive data.

Figure 15:
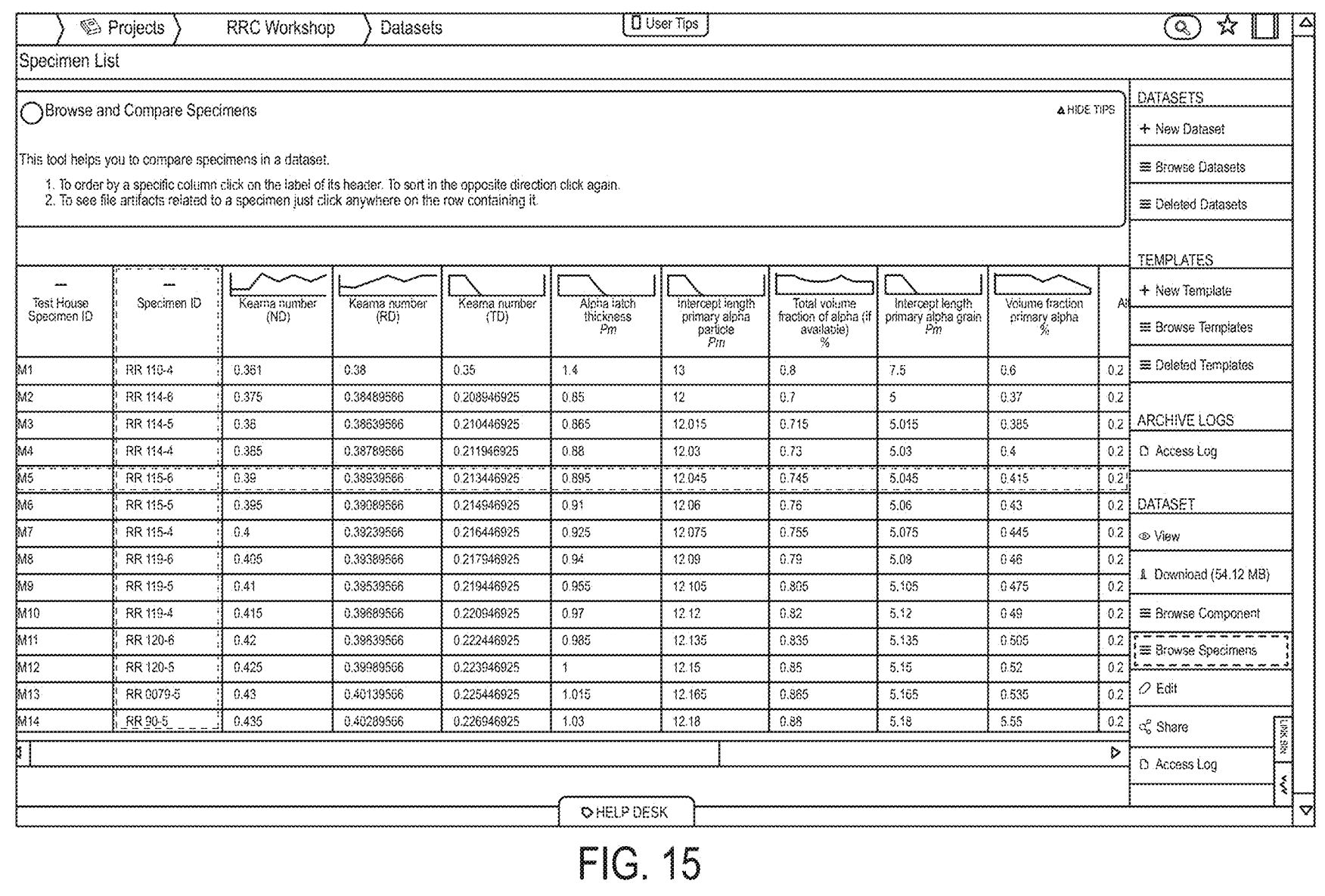

FIG. 15 is an example of a browse and compare specimens page with a highlighted specimen. The BDP enables visualization or download of data stored in the zip archive if a naming convention was used when creating the files or directories. In the example shown above, the M# naming convention was used when creating the data, so the user may review all M5 data (in other words, data from all spreadsheets named "M5" that were included in the archive file that was uploaded, which in this sample was the "small_dummy_data" zip file). Graphs of corresponding data may be generated from the data and displayed in, for example, the column headers as shown in FIG. 15.

If the user clicks on the M5 row shown in FIG. 15, the portal will show the user all of the files that have M5 at the beginning of the file or directory name. The image shown in FIG. 16 shows the portal response when the M5 row is selected.

Figure 16:
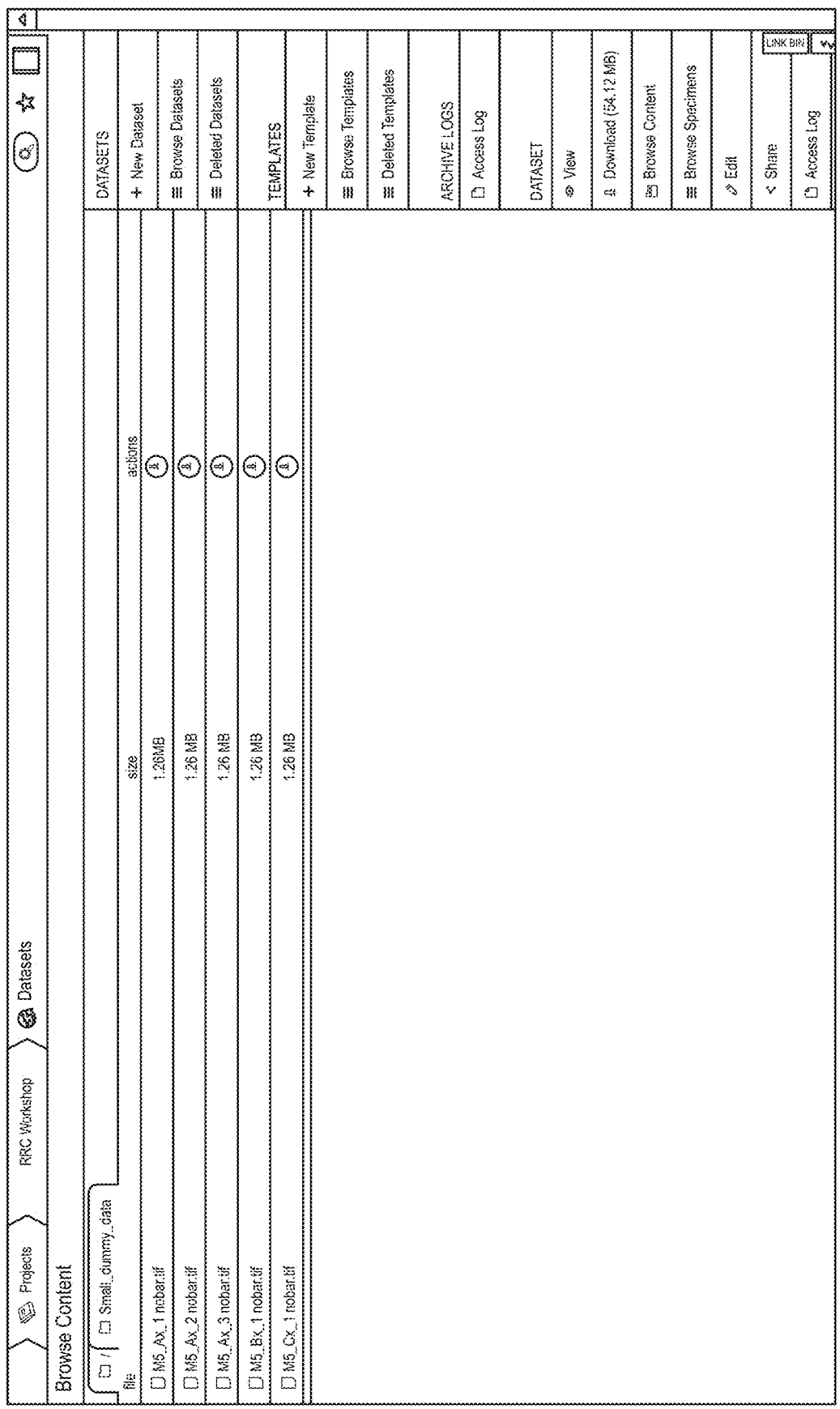
FIG. 16 is a window showing M5 data stored in an artifact zip file.

FIG. 16 is a window showing M5 data stored in an artifact zip file.

Figure 17:
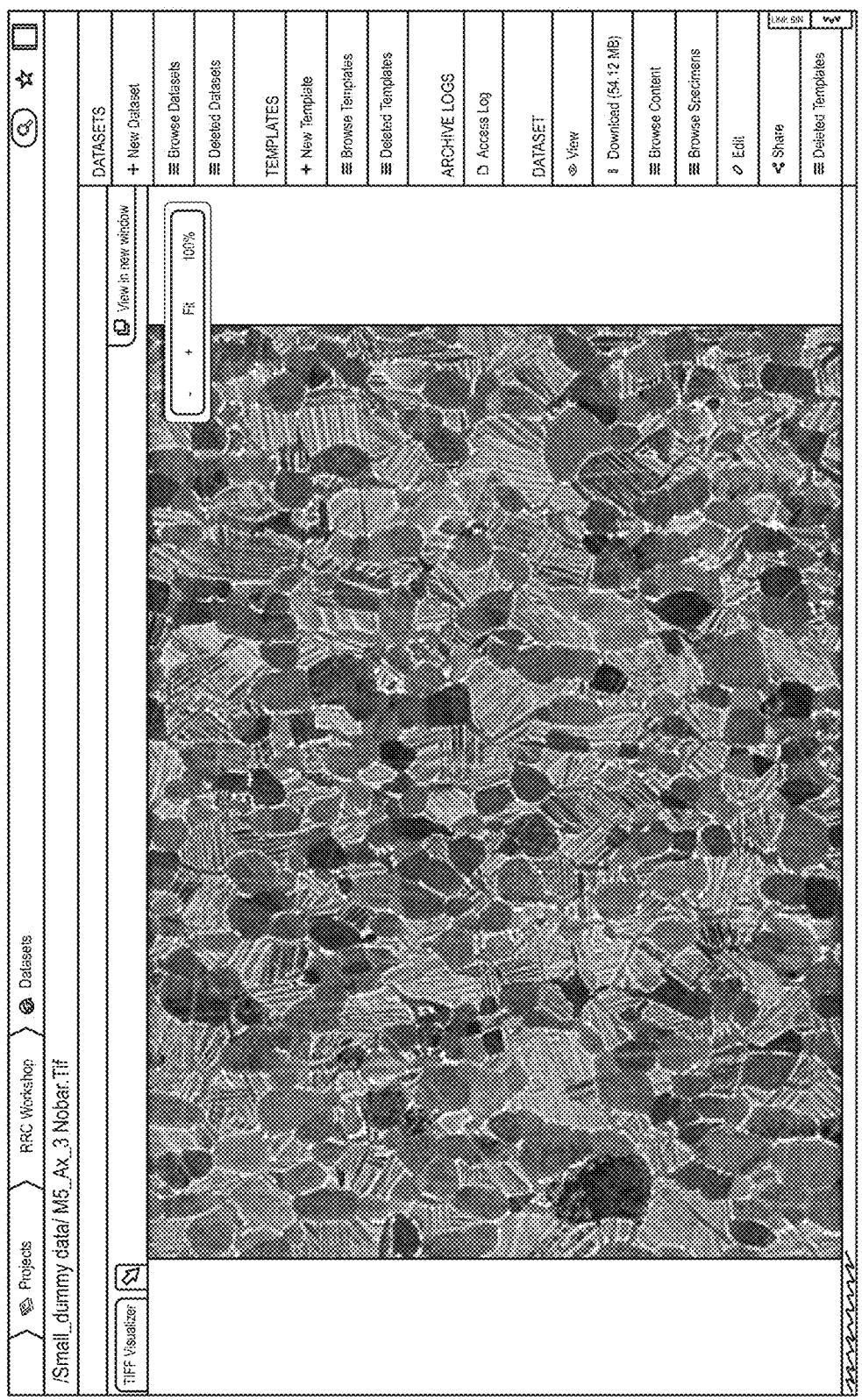
FIG. 17 is a portal visualization of an M5_Ax_3 nobar.tif.

FIG. 17 is a portal visualization of an M5_Ax_3 nobar.tif, which is a file that was included in the zip file that was uploaded to the portal.

Figure 18:
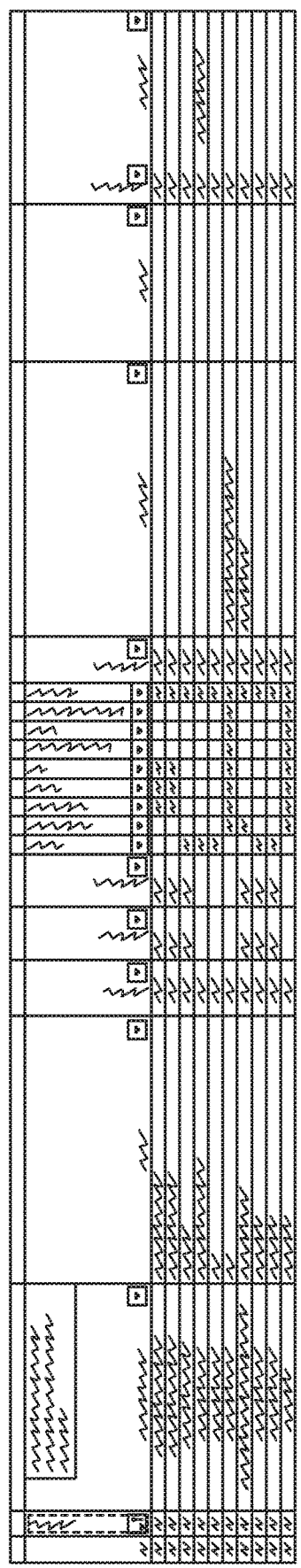
FIG. 18 is an example of an attribute registration spreadsheet file showing a community attribute list.

FIG. 18 is an example of an attribute registration spreadsheet file. The spreadsheet file may be any type of spreadsheet, such as a Microsoft Excel spreadsheet file or an Open Office spreadsheet file. The attribute registration spreadsheet file shows a current community attribute list. The attribute list spreadsheet file may be used to program the community's attributes by uploading the file into BDP.

Figure 19:
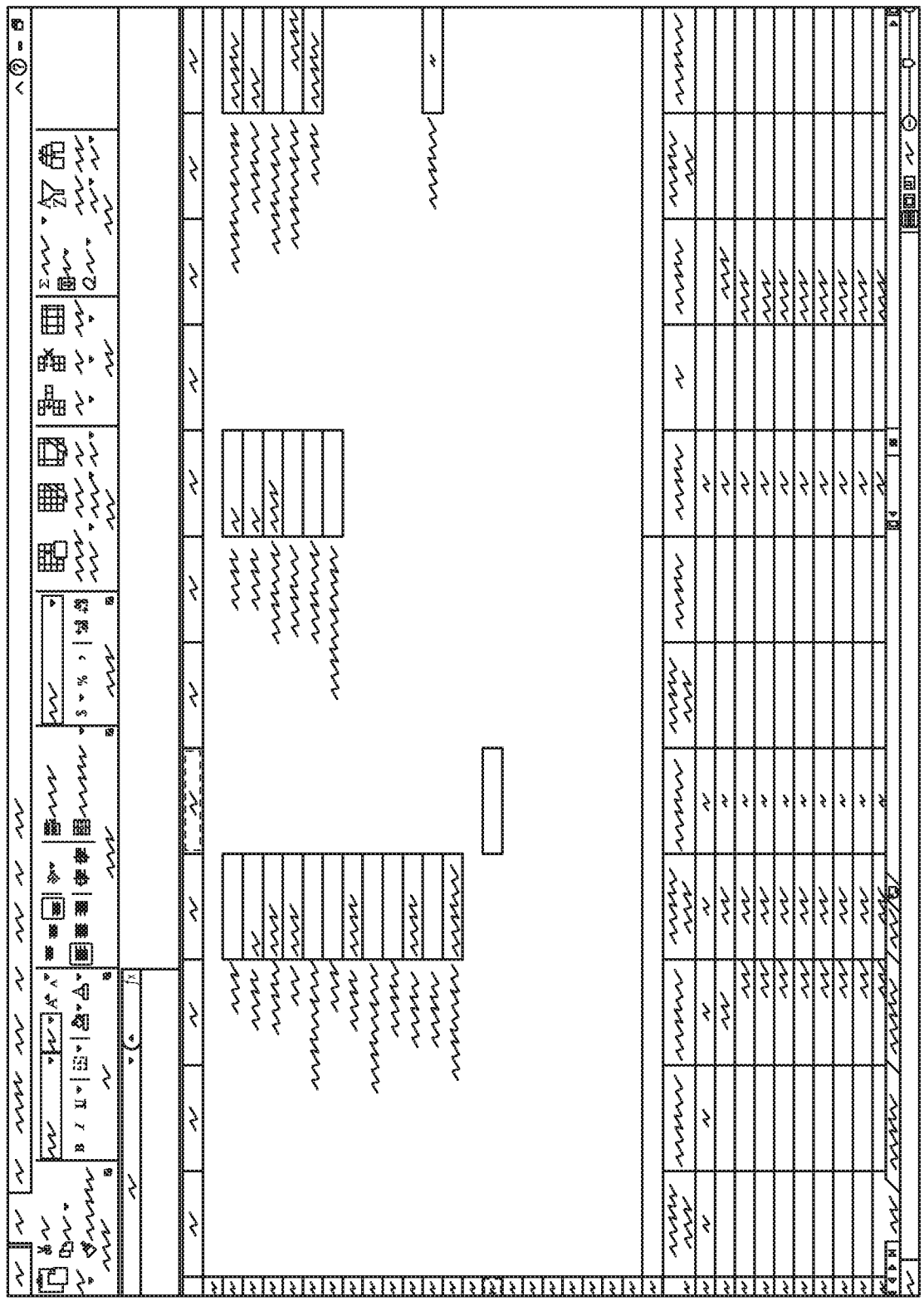
FIG. 19 is an example of a template spreadsheet file used to store data into a portal during archive upload

FIG. 19 is an example of a template spreadsheet file that may be used to store data into an archive of the BDP by uploading the template spreadsheet file. The template spreadsheet file in the example shown in FIG. 19 includes multiple sheets. One is an "Attribute lookup" sheet that identifies key cell locations and attaches or maps a named attribute to a named cell. Another is a sheet named "Results" in FIG. 19 includes archive data.

Figure 20:
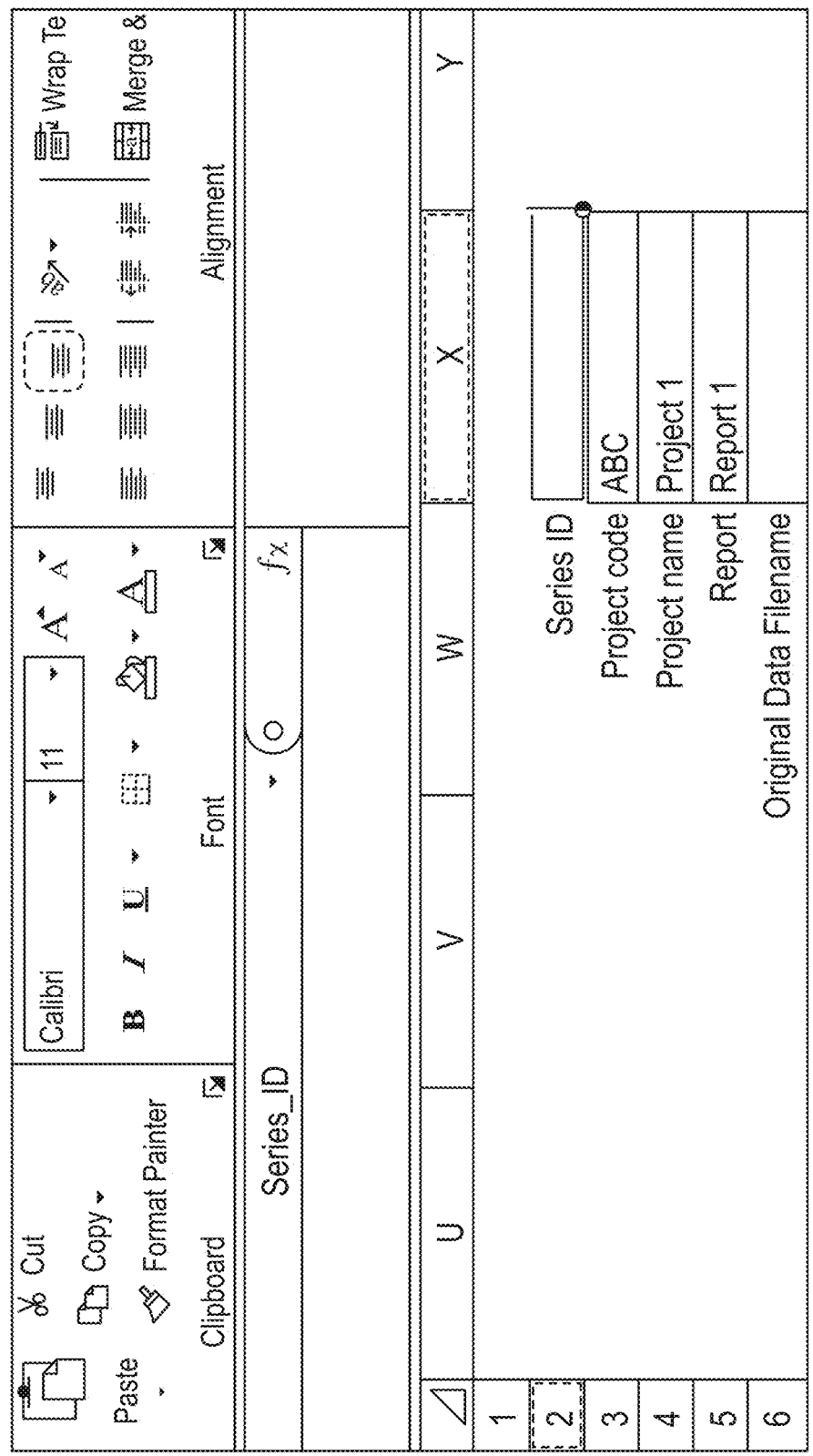
FIG. 20 is an example of a header section of a template spreadsheet file, the X2 cell has the name Series_ID defined.

FIG. 20 is an example of a header section of a template spreadsheet file, where an X2 cell has the name Series_ID defined.

FIG. 21 is an example of a second portion of the template spreadsheet file, namely, a portion of the Attribute Lookup sheet showing a cell name and attribute reference mechanism. In the Attribute Lookup sheet example shown in FIG. 21, Column A 2102 is for community attribute name, column B 2104 identifies the corresponding type of data to read, column C 2106 identifies the corresponding units, column D 2108 identifies the sheet in the spreadsheet that contains the data to read for the community attribute, column E 2110 identifies the corresponding cell or row to read for the community attribute, and column F 2112 identifies the name of cell in spreadsheet to read for the community attribute. For a row of data to be read during upload of the spreadsheet, the ROW is defined and the cell name is placed at the top of the column of data of the named sheet, which in the illustrated example is "Results". The Attribute Lookup sheet may include additional, fewer, or different columns and/or rows than are depicted in FIG. 21. Each of the rows in the Attribute Lookup sheet is for a respective one of the community attributes and a corresponding column in the "Results" sheet in the illustrated example.

In this example, when registering the template with the BDP (uploading the template), the user may provide the example spreadsheet file, identify the "Attribute Lookup" sheet name, and verify that the BDP has recognized the data before saving the template to the portal. A new archive in the portal database may be created that includes the data in the "Results" sheet stored as rows in the portal database having attributes matching the community attribute names in Column A 2102 identified in the "Attribute Lookup" sheet.

More generally, a spreadsheet comprising a worksheet may be received by the BDP. For example, a user may upload the spreadsheet and a server implementing the BDP may receive the worksheet in response. The worksheet may include attribute lookup information and archive data. The attribute lookup information may include a list of attributes and, for a respective attribute included in the list of attributes, an identity of a cell and/or a row corresponding to the respective attribute. For example, FIG. 21 shows the list of attributes in column A 2102 and the identity of the cell and/or the row in columns F 2112. The cell and/or the row is included in the sheet, and the cell and/or the row comprises a portion of the archive data that includes a data value for the respective attribute. For example, FIG. 19 shows the data in a sheet named "Results".

The archive data may be stored in the portal database based on the attribute lookup information. For example, the list of attributes in the attribute lookup information may identify attributes of the portal database in which the archive data is stored.

The portal database may comprise a memory including an electronic collection of information stored therein. The information may be organized so that the information may be accessed, managed, and updated. Examples of a database include but are not limited to a Relational Database Management System (RDBMS), an object-oriented database, a data lake, a file system, memory structures, or other organization and storage mechanism. The database may use any type of memory and structure, such as a random access memory (RAM), an erasable programmable read-only memory (EPROM), flash memory, optical memory, magnetic (hard-drive or tape) memory or other memory device. The database may include database entries. A database entry is information that may be retrieved from or stored in the database. The database entry may be accessed or looked-up using a unique key, such as a primary key value, a full path name, or a memory address. For example, the database entry may be a row in a table in an RDBMS. In other examples, the database entry may be stored across multiple locations in the database, such as across multiple tables in an RDBMS. A table in an RDBMS may include one or more columns. The database may include a collection of databases.

Users may be provided access to the archive data stored in the portal database. For example, the BDP may provide access to users by generating a user interface for viewing the archives (or data sets) as shown, for example, in FIG. 12. Alternatively or in addition, BDP may generate a graphical interface for viewing the contents of any of the archives in response to selecting an archive.

The worksheet may include a first worksheet and a second worksheet, where the first worksheet includes the attribute lookup information, and the second worksheet includes the archive data. Alternatively, the worksheet may include a single worksheet. Alternatively, the worksheet may include more than two worksheets.

The BDP may store the archive data in the portal database by always inserting the archive data in new rows of the portal database instead of updating existing rows of the portal database. Alternatively or in addition, the BDP may store the archive data in the portal database by always creating an archive and inserting the archive data into the archive.

The BDP may create the attributes of the portal database (in other words, community and/or team attributes) in response to receiving a programming spreadsheet that includes definitions of the attributes of the portal database. For example, the BDP may read the names and data types of the attributes from the programming spreadsheet and create a table in the portal database that has similar and/or corresponding column names and data types. Creating the attributes of the portal database may be in response to a determination that a user uploading the programming spreadsheet is a member of a predetermined group that has permissions to create attributes in the portal database. In such an example, if a user fails to have such permissions, the attributes will not be created.

Figure 22:
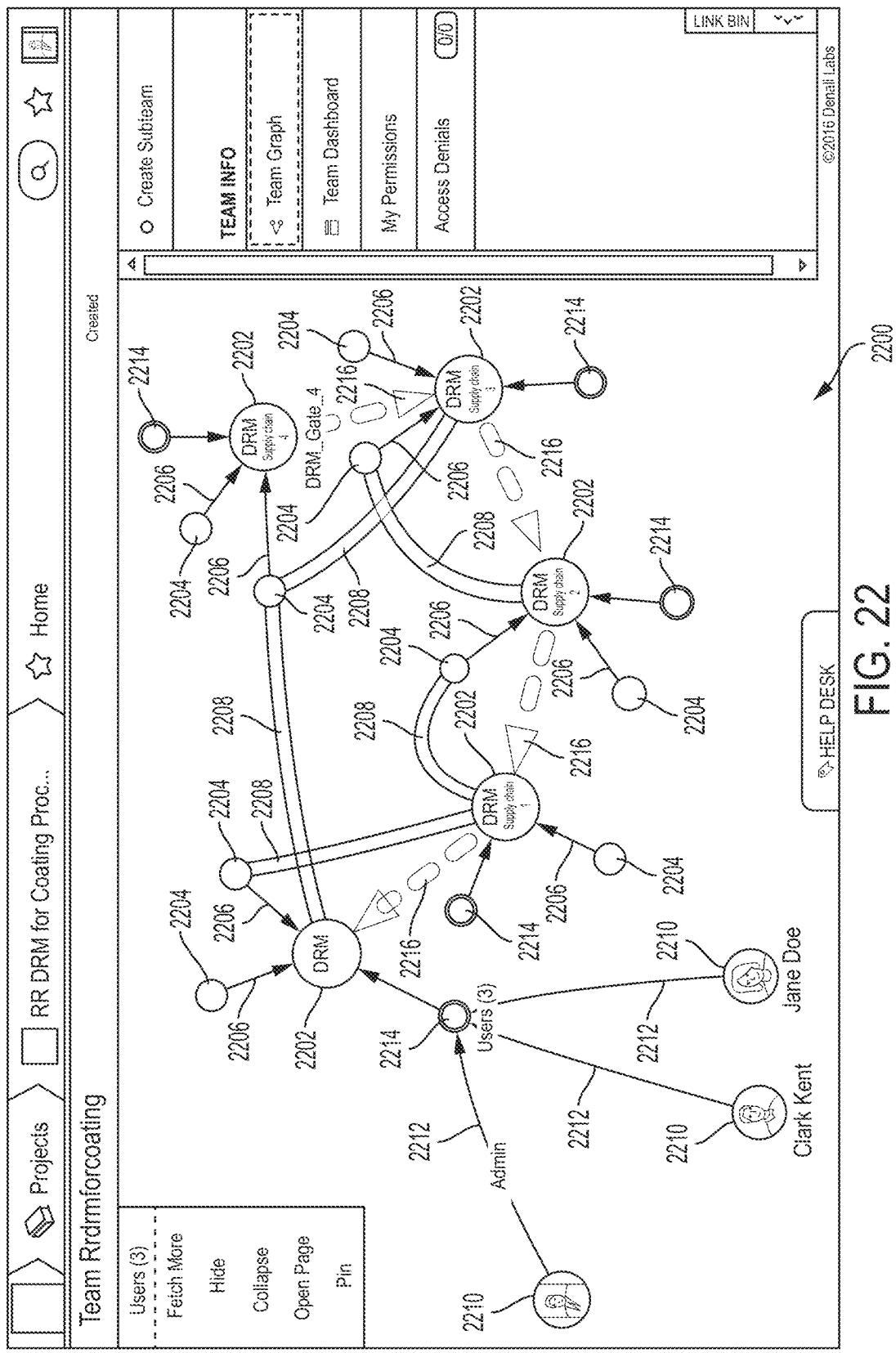
FIG. 22 is an example of a Gated DRM release process across a given supply chain.

FIG. 22 is an example of a Gated DRM release process across a given supply chain. Alternatively, information about any other process may be similarly displayed. The faces of the team members that make up the DRM team may be seen in FIG. 22. If a user wants to contact or communicate with one of the two other team members, then the user may right-click on the team member's picture and thereby open the team member's profile page. From the team member's profile page, the user may start a conversation or use the team member's contact information to call or email the team member.

The visualization tool may provide an ability to show the team and team members graphically, which teams are connected to a process, which users have access to data, and/or what data is being shared. The visualization tool may generate a graphical user interface 2200. For example, team nodes 2202 representing teams may be displayed, each of the team nodes 2202 corresponding to a respective one of the teams, each of the teams comprising at least one respective user. In addition, data nodes 2204 and data ownership lines 2206 may be displayed, each of the data nodes 2204 representing data, each of the data ownership lines 2206 connecting a respective one of the data nodes 2204 to a respective one of the team nodes 2204 indicating that data represented by the respective one of the data nodes 2204 is owned by the respective one of the team nodes 2202. Each of the data ownership lines 2206 may include, for example, an arrow pointing to a respective one of the team nodes 2202 that represents the team that owns the data represented by the connected data node. At least one team relationship line 2216 between the team nodes 2202 may be displayed that indicates a relationship between the teams represented by the team nodes 2202. For example, the relationship line 2216 may have an arrow at a first end of the line 2216 pointing to the team node that represents a team that is a parent of the team represented by the team node at a second end of the line 2216.

In some examples, an access line 2208 may be displayed between a data node included in the data nodes 2204 and a team node included in the team nodes 2202, the access line 2208 indicating that a team represented by the team node has access to data that is represented by the data node. In other words, the access line 2208 indicates that the data represented by the data node is data that is shared with the team represented by the team node. In FIG. 22, the data owned by DRM Supply chain 4 has been shared with DRM Supply Chain 3 and the DRM team because the access lines 2208 connect the data node associated with the DRM Supply Chain 4 team to the team nodes 2202 representing the DRM Supply Chain 3 team and the DRM teams.

Alternatively or in addition, a user node 2210 representing a user and displaying a membership line 2212 between the user node 2210 and a team node included in the team nodes 2202 or between the user node 2210 and a members node 2214 associated with the team node, the membership line 2212 indicating that the user is a member of the team represented by the team node. In some examples, user nodes 2210 representing users that are members of the team represented by the team node, and their corresponding membership lines 2212 may be displayed in response to a selection of the members node 2214 or to a selection of the team node.

Alternatively or in addition, an accessed line (not shown in FIG. 22) may be displayed between the user node and a data node that is included in the data nodes 2204, the accessed line indicating that the user represented by the user node had accessed data that is represented by the data node.

In some examples, a list of files comprising data that is represented by any of the data nodes 2204 may be displayed in response to detection of a selection of the data node. Alternatively or in addition, a list of archives comprising data that is represented by the data node may be displayed in response to detection of a selection of the data node. Each archive identified in the list of archives may include a data set stored in compliance with the attributes shared by two or more of the teams in a manner described above. In some examples, an archive node (not shown) representing at least one data set stored in compliance with the attributes shared by two or more of the teams may be displayed, and a list of archives comprising data that is represented by a data node associated with the archive node may be displayed in response to detection of a selection of the archive node.

In some examples, the data nodes 2204 may be clicked or otherwise selected in order to open up the files stored in the team's File tool. Alternatively or in addition, archive nodes (not shown) may be displayed for archives owned by each team, where the archive nodes may be displayed in a color that is different than a color of the data nodes 2204.

The visualization tool may also show:
a. The types of data stored in the team may be indicated with icons for types of artifacts. Alternatively or in addition, a graphical representation for the amount of use of the artifact may be shown.
b. A color dot may be shown for discoverable attributes of data stored in the team.
c. The kind of sharing that is being conducted between the teams may be shown. For example, a graphical indicator may indicate which attributes are shared.
d. A graphical link to external databases or communities may be shown, allowing the user to navigate the internet and determine where other team data is coming from and who owns what data and where that data is kept in the world.
e. 3D navigation of data, showing the data/team structures in contrast with other realms and connected to vast communities, enabling graphical navigation of the data so the understanding of large communities and amounts of connected data may be understood on a human level.
f. 3D navigation to virtual stores built in WebGL, or any other 3D web language, with commercial products shown in 3D, using solid model definition and other virtual solid shapes and forms with data attached so each component of a lawn mower, computer, washing machine, or any other product with 3D solid model data may be shown in 3D with linked data graphically available for review or selection. The 3D trees structure or other 3D visualization tools to enable the human to easily understand that data is available as well as visualize the data in an understandable fashion or realm.
g. 3D navigation across corporate, academic, industrial, governmental, military, and other communities where team work is desired, enabling silos of effort to collaborate and incrementally build on a diverse array of teams from across the silos mentioned. For example, the entertainment community, commercial software community, and the NASA community may all build on finite element technology across their respective communities using the visualization tool, discoverable attributes, and the BDP.
h. A graphical representation of the connected data and users at a given time to document of who had access to what and when.
i. The user hierarchy defined by the team, who controls what and who does what. May feed off of LinkedIn portal user community.
j. An icon for delays in a gated workflow, icons for tasks assigned to a team and/or a user and icons for current forum discussions around the user's picture.
k. An icon around or on the user's picture to show that the user is currently logged into the portal.
l. 3D graphical overlay showing team's connection to other communities' data/attributes and other communities' data/attributes and so on. Crowd collaboration based on discoverable attributes.

Figure 23:
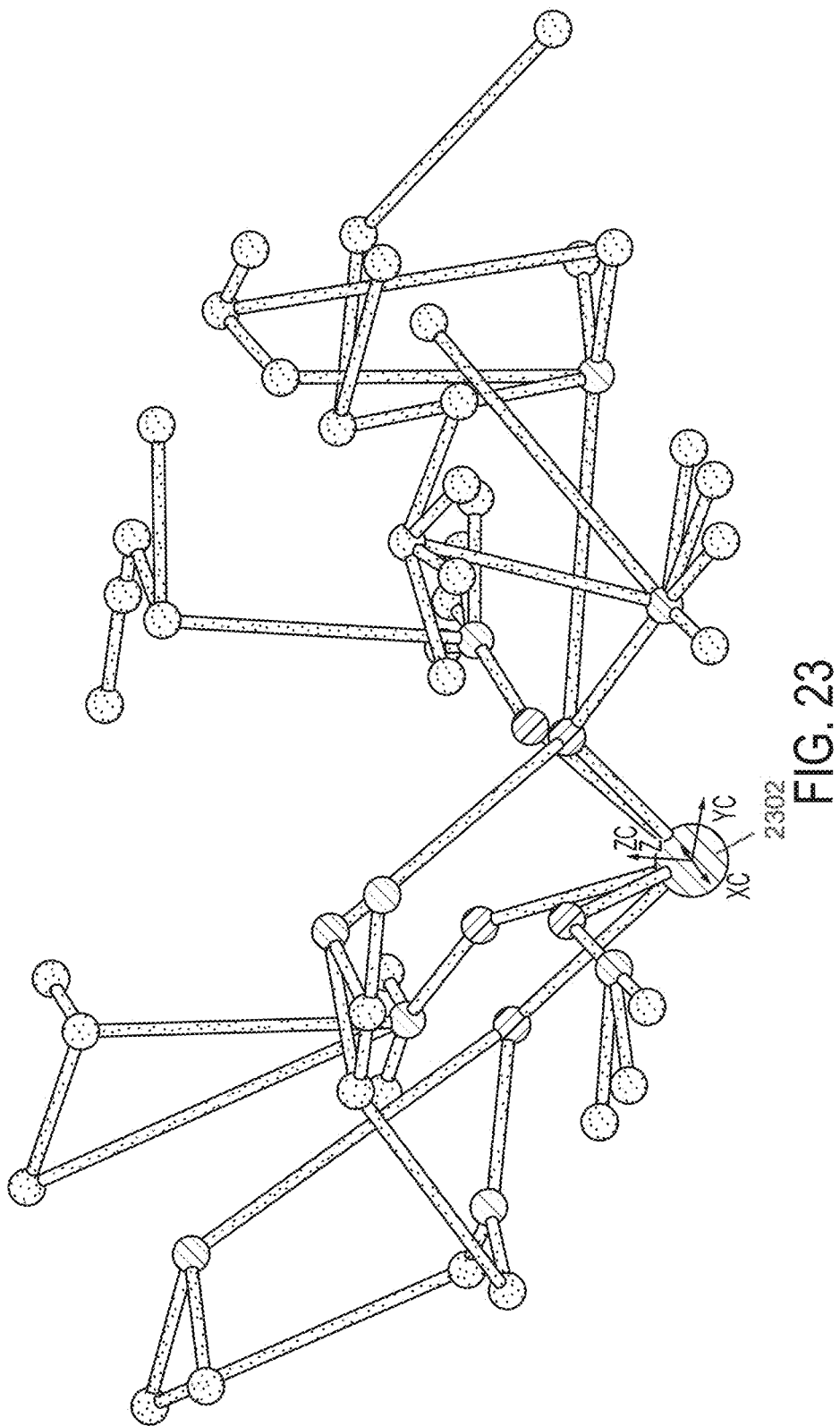
FIG. 23 is a 3D structure visualization example of connected data across teams or communities.

FIG. 23 is a 3D structure visualization example of connected data across teams or communities. In the illustrated example, the teams may be represented by spheres. A prime contractor is represented by a sphere 2302 that is larger than the other spheres displayed by the PDB. The colors of the spheres may be based on the organizational category in which the team represented by the sphere belongs. Lines between the spheres may show data flow between the teams (for example, organizations).

Figure 24:
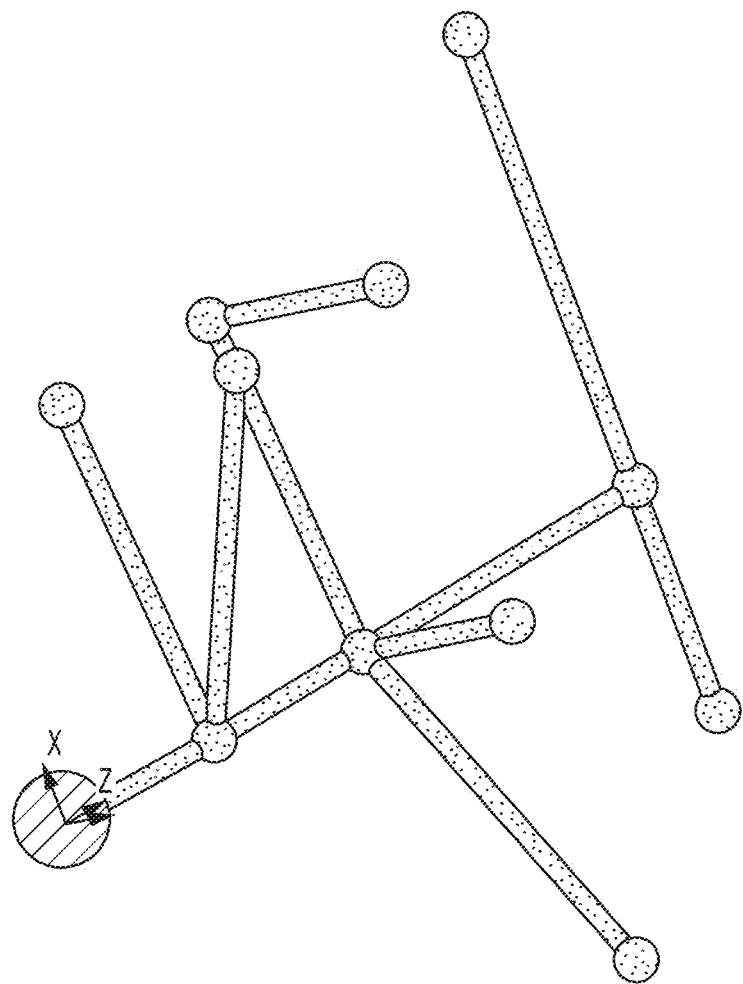
FIG. 24 is a simplified 3D data structure example.

FIG. 24 is a simplified 3D data structure example. In this example, the serial supply chain is shown with second tier suppliers represented by spheres offset from a central line that represents the serial supply chain. The distance that each of the spheres is offset from the central line is based on a volume of parts supplied to serial supply chain. For example, the higher the volume of parts supplied, the further the corresponding sphere is offset from the central line.

Figure 25:
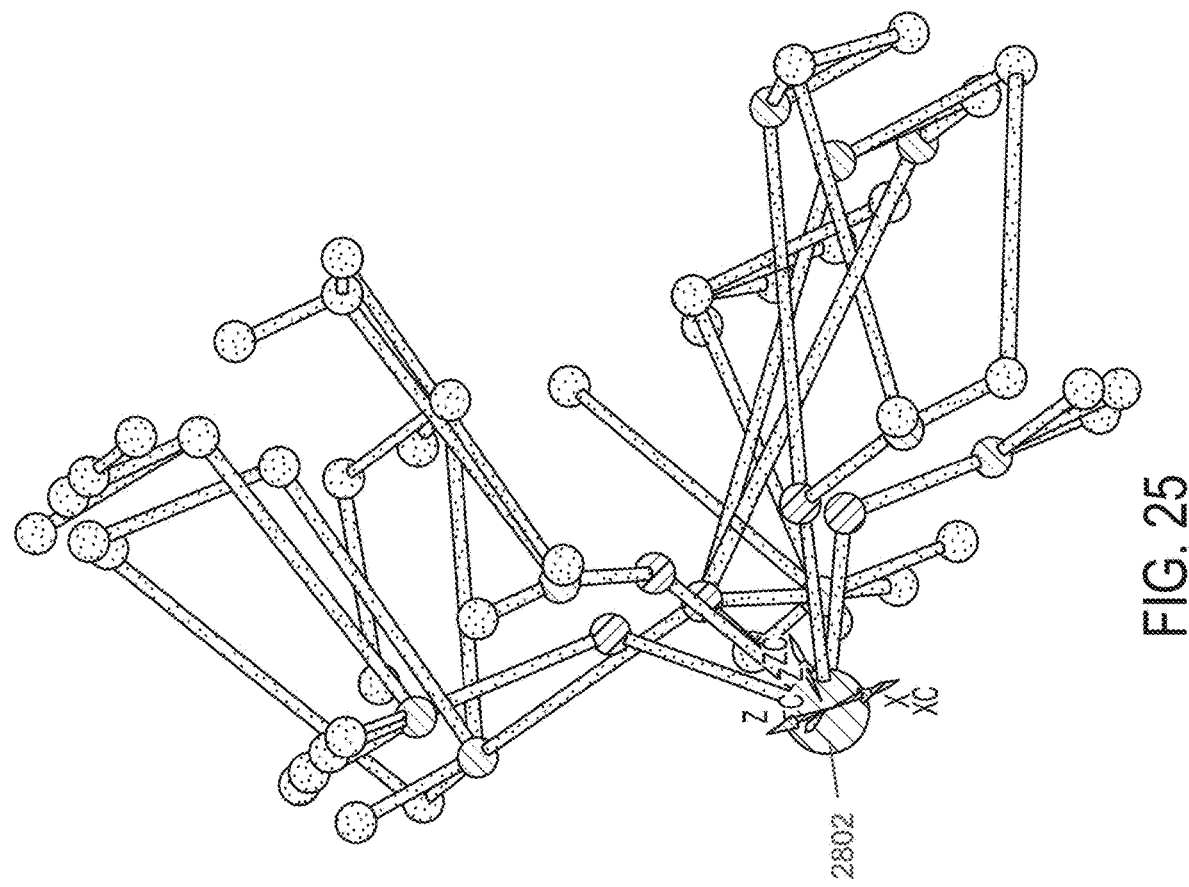
FIG. 25 is an example of a 3D Prospective view of 3D data structure linking data across tiered supply chain showing critical suppliers, suppliers targeted for cost reduction, and prime suppliers as well as the Original Equipment Manufacturer.

FIG. 25 is a 3D perspective view of a 3D data structure linking data across a tiered supply chain. Each organization (team) may be represented as a sphere in the 3D data structure. The spheres representing organizations may be displayed according to a category or type of the corresponding organization. For example, suppliers that have been designated critical suppliers may be displayed in a first color, such as red, while suppliers targeted for cost reduction may be displayed in a second color, such as white, and prime suppliers shown in a third color, such as green. An Original Equipment Manufacturer (OEM) 2802 may be shown in a forth color, such as blue. If data is shared between any two organizations, a line may connect the two spheres representing the organizations.

Figure 26:
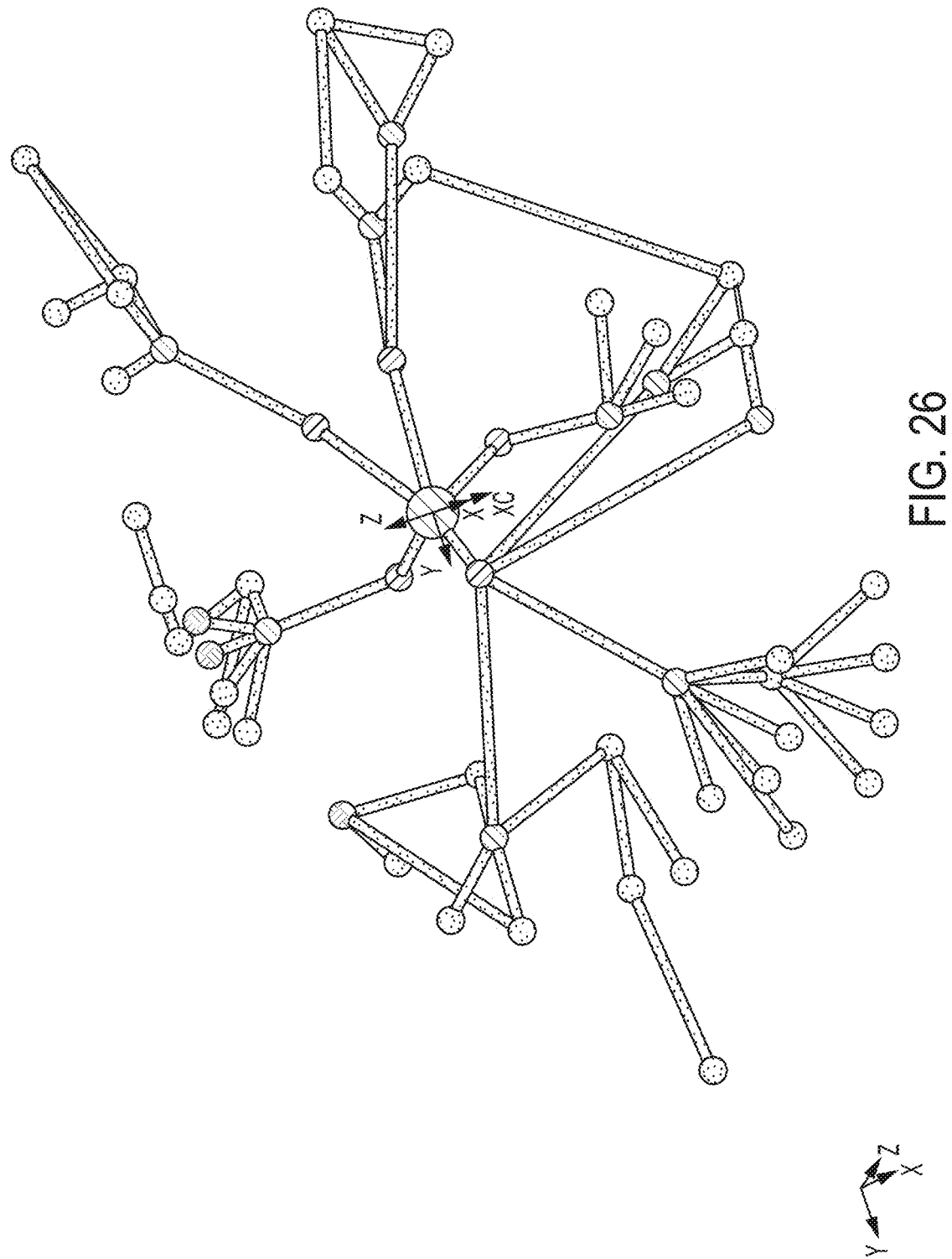
FIG. 26 is an example of a 3D supply chain, picking on dots to visualize stored data and/or attribute information associated with the dot/company/team or communities.

FIG. 26 is an example of exploring the supply chain in 3D, picking on dots to visualize stored data/attribute information associated with the dot/company/team or communities.

Figure 27:
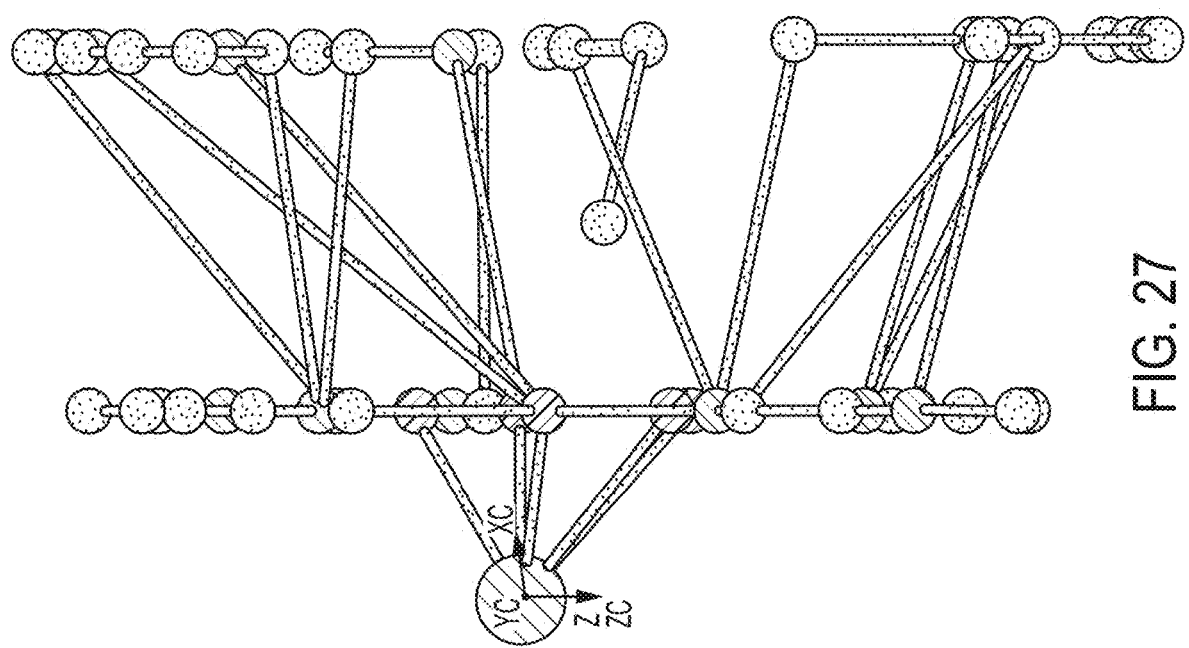
FIG. 27 is an example of a 3D visualization using color, location, connection, images and/or graphics, and other visualize structures or connections.

FIG. 27 is an example of a 3D visualization using color, location, connection, images, graphics, and/or other visualize structures or connections so the user may navigate the community's data and/or information in real time and understand the connection of the data.

Figure 28:
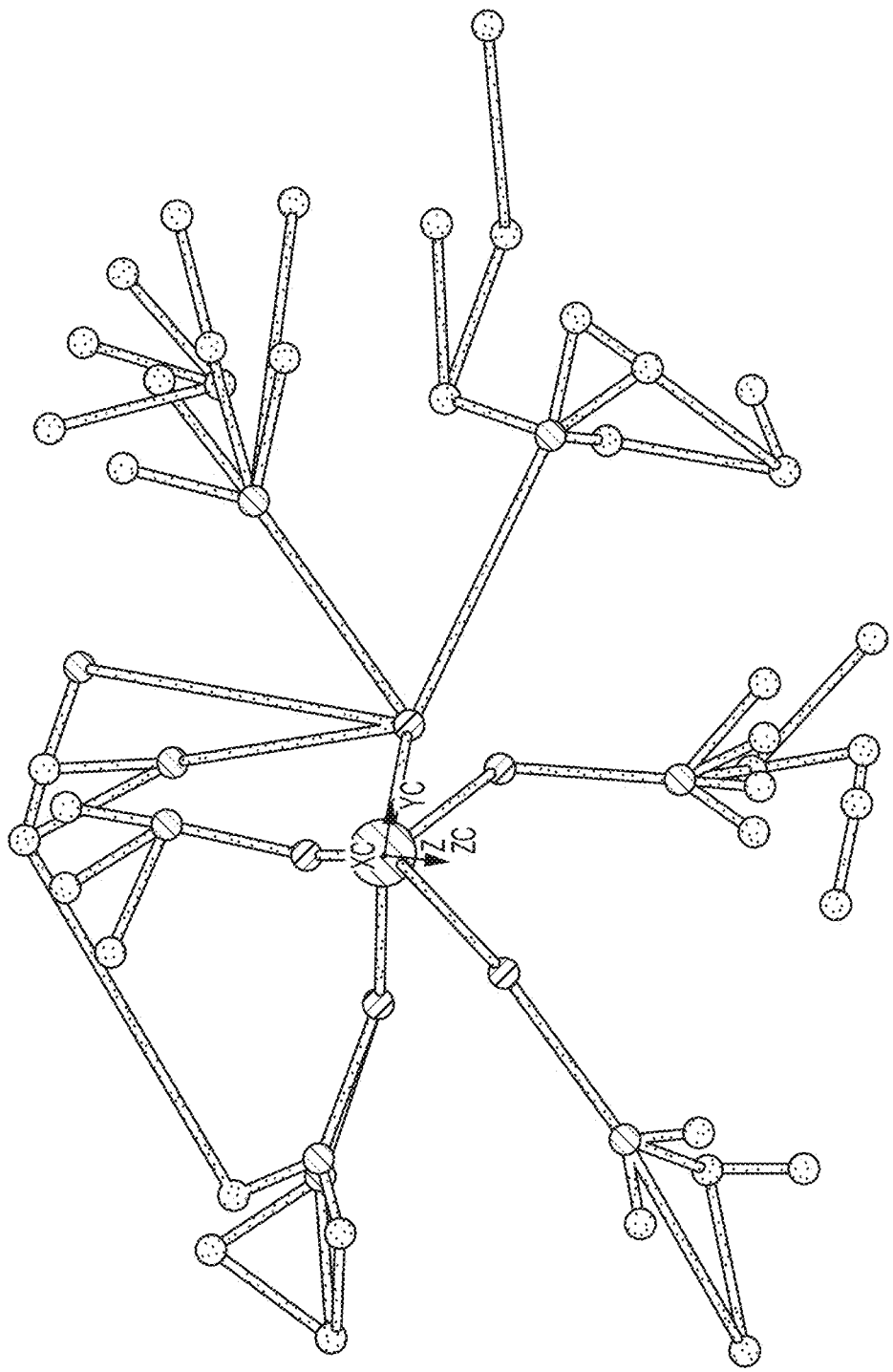
FIG. 28 is an example of a 3D visualization tree structure representing a workflow across a diverse set of companies, teams, and/or communities.

FIG. 28 is an example of a 3D visualization tree structure representing a workflow across a diverse set of companies/teams or communities.

Figure 29:
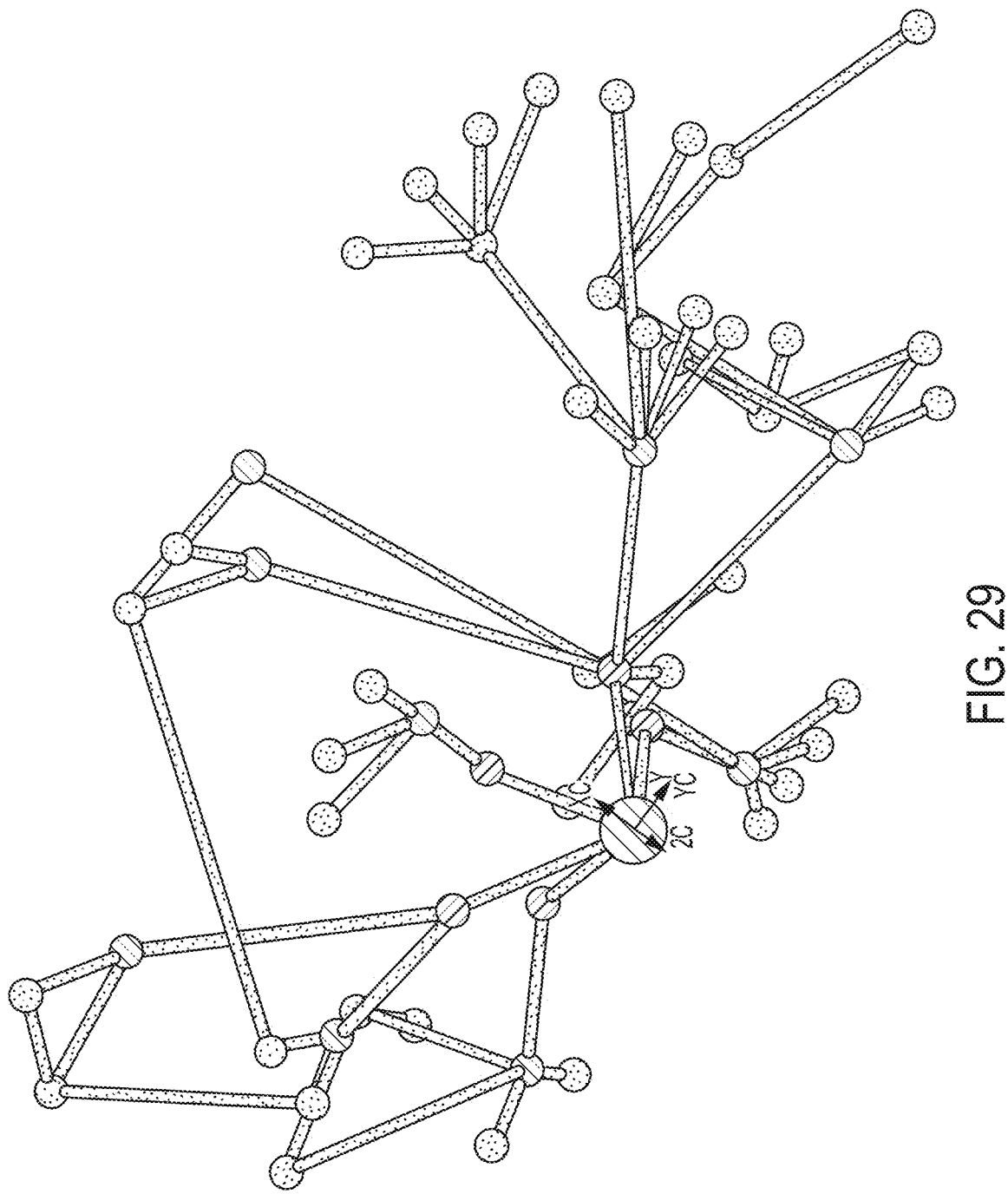
FIG. 29 is an example of a 3D tree structure visually conveying updates on a user's requests or queries.

FIG. 29 is an example of a 3D tree structure that may be dynamic and may update based on a user's request/queries. The 3D tree structure may be flexibly built so that the data and connections may convey information visually.

Figure 30:
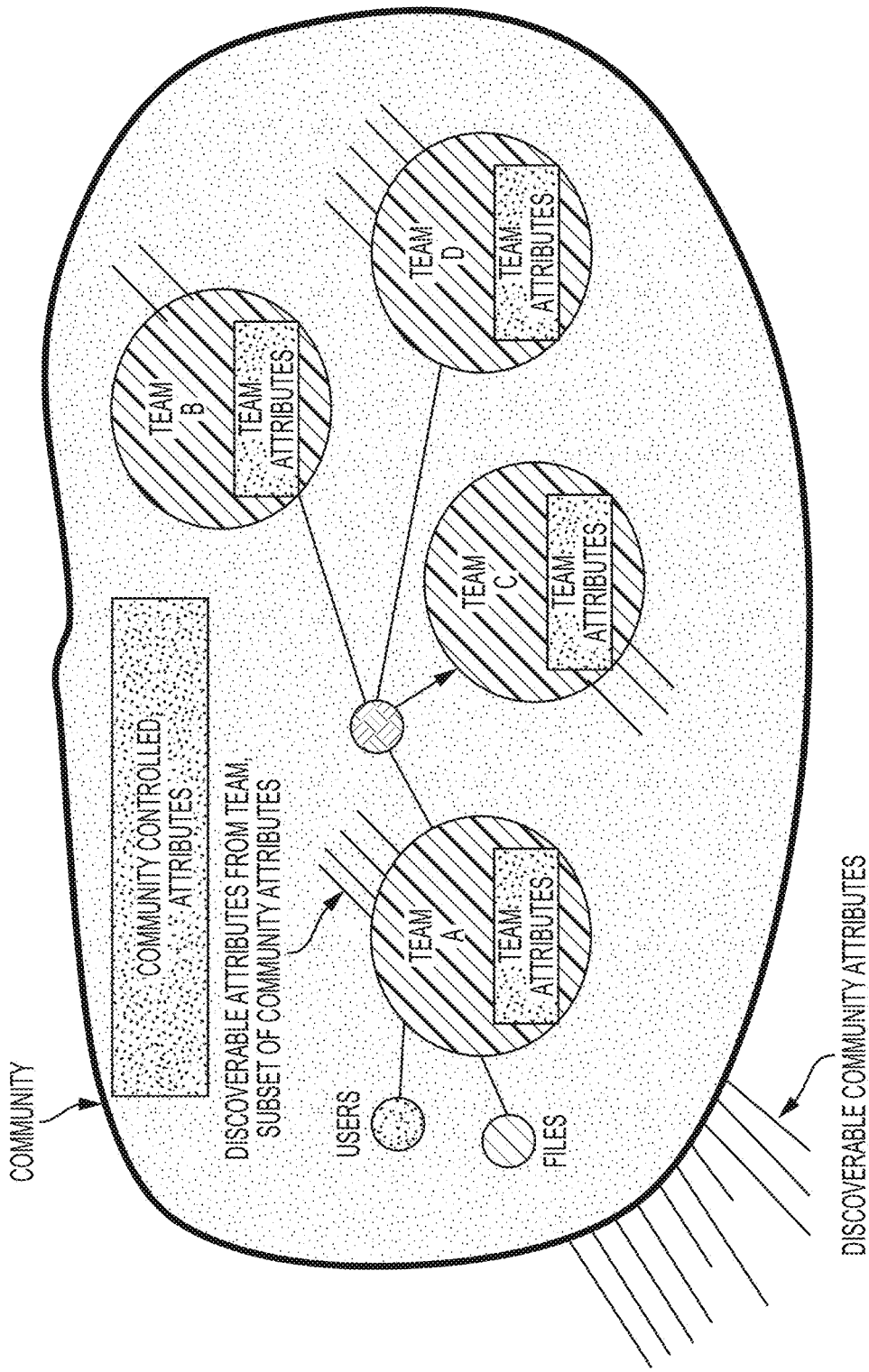
FIG. 30 is a diagram showing an example of teams that make their attributes discoverable by other teams in a community and the community making a set of the community's attributes discoverable by other communities.

FIG. 30 is a diagram showing an example of teams that make their attributes discoverable by other teams in a community.

Figure 31:
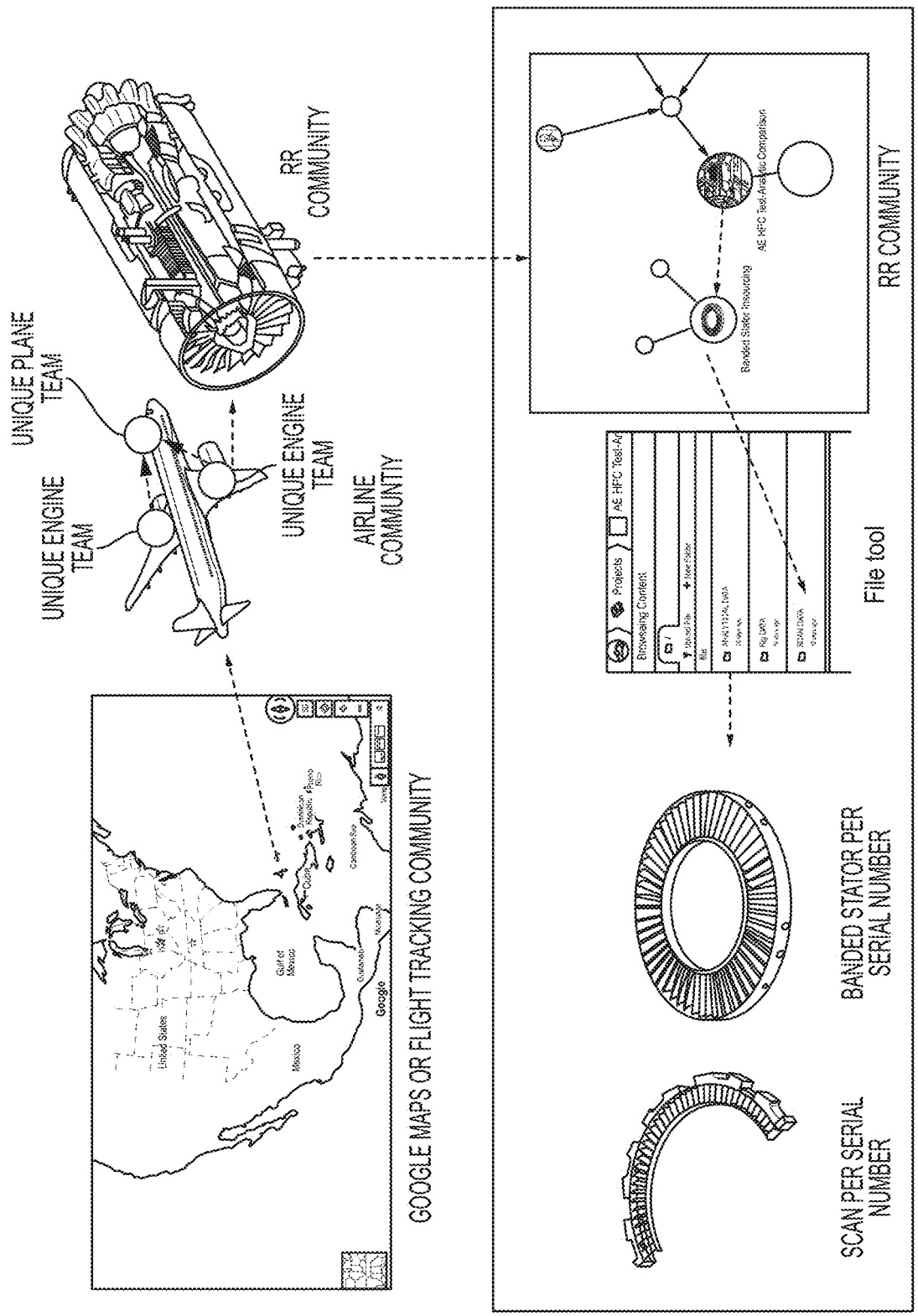
FIG. 31 is a flow diagram showing an example of a team or community that may make their attributes discoverable by other teams or communities.

FIG. 31 is a flowchart showing an example of a team or community that may make their attributes discoverable by other teams or communities. The visualization tool may graphically show the connection between teams or between communities.

The visualization tool showing the team/community's connections and discoverable attributes enables rapid crowd collaboration over a supply chain or other industrial/academic/other team efforts. The visualization tool enables incremental improvement or knowledge/data building across a business, supply chain or other collective team work and is new to the market place. The teams ability to collect all of the necessary data in one place, document the decisions of the team, and quickly communicate across the team and community network enables business to incrementally improve their business processes, improve the bottom line because of labor savings and incrementally improve their organization based on team delivery.

Examples of some of the features of the BDP are shown in user interfaces or graphical user interfaces. The BDP may generate the graphical user interfaces and cause the interfaces to be displayed on one or more display devices. Any of the features of the BDP may be combined together or implemented separately from other features. For example, the visualization tool, the attribute control program, the team centric approach for sharing and visualizing information, and portal management tools may be implemented together.

Figure 32:
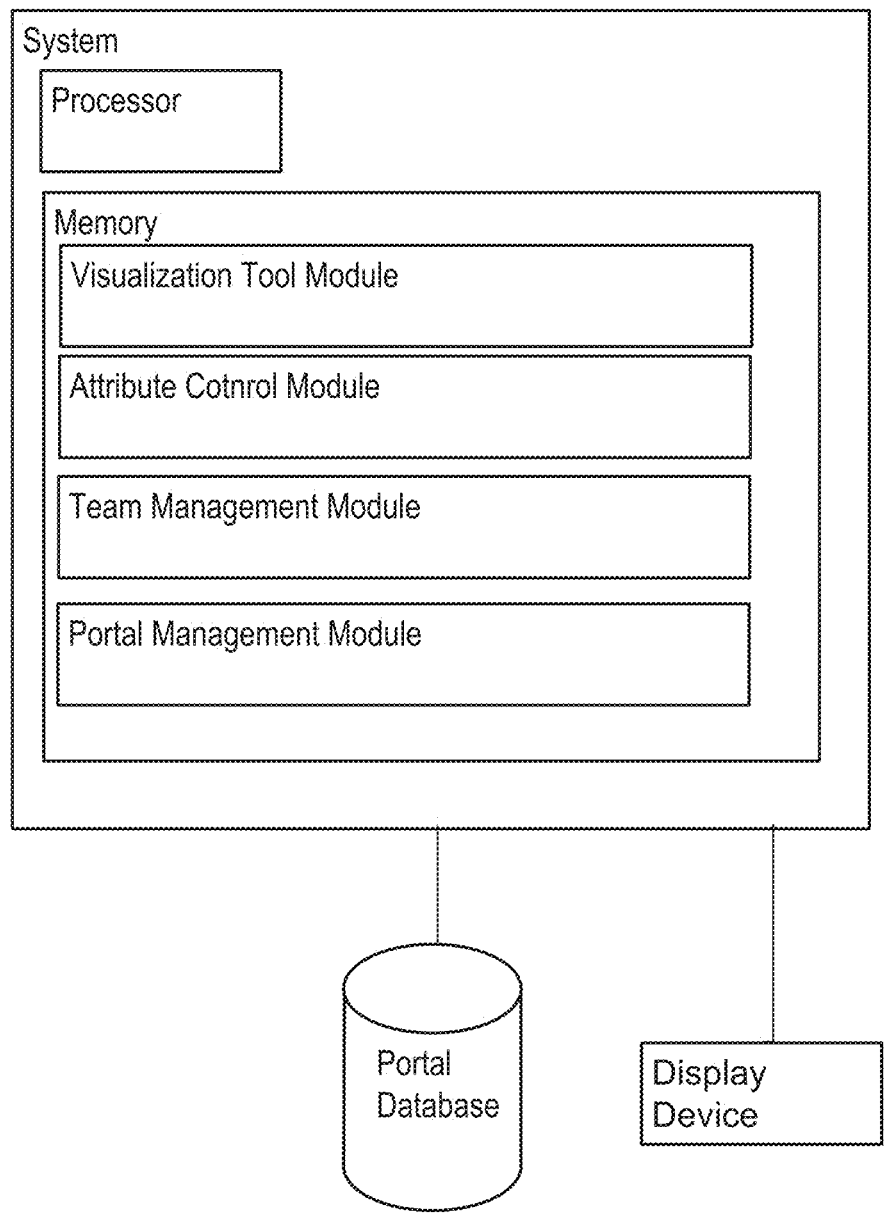
FIG. 32 is schematic diagram of an example of a system including modules that implement the four features of the business data portal.

FIG. 32 is an example of a system that implements the BDP. The system may include, for example, a visualization tool module, an attribute control module, a team management module, a portal management tool module, and a portal database. The visualization tool module may be configured to generate a user interface that illustrates team and data connections in two or three dimensions, such as the user interface shown in FIG. 1. The attribute control module may be configured to import a spreadsheet or any other type of file that includes a template and/or a template with data into a database as described herein. Alternatively, or in addition, the attribute control module may be configured to search the database, make attributes discoverable, and/or perform any other attribute control features described herein. The team management module may be configured to create teams, delete teams, cause team information to be displayed, and/or perform any other team management features described herein. The portal management tool module may be configured to provide portal functionality to each team. For example, the portal management tool module may provide administrative features for each team, file sharing functionality, a discussion forum, an archive tool for bulk uploads, a docs tool to create web pages, and a manage tool to set milestones and assign tasks.

The system, such as the system in FIG. 32, may include a memory, a processor, and a display device. The system may be implemented with additional, different, or fewer components than illustrated. For example, the system may not include the display device.

The processor may be in communication with the memory and a network interface. In one example, the processor may also be in communication with additional elements, such as the display device. Examples of the processor may include a general processor, a central processing unit, a microcontroller, a server, an application server, a web server, an application specific integrated circuit (ASIC), a digital signal processor, a field programmable gate array (FPGA), and/or a digital circuit, analog circuit.

The processor may be one or more devices operable to execute logic. The logic may include computer executable instructions or computer code embodied in the memory, which when executed by the processor, may cause the processor to perform the features implemented by the logic. The computer code may include instructions executable with the processor.

The system may be implemented in many different ways. Each module of the system may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory, for example, that comprises instructions executable with the processor or other processor to implement one or more of the features of the module. When any one of the module includes the portion of the memory that comprises instructions executable with the processor, the module may or may not include the processor. In some examples, each module may just be the portion of the memory or other physical memory that comprises instructions executable with the processor or other processor to implement the features of the corresponding module without the module including any other hardware. Because each module includes at least some hardware even when the included hardware comprises software, each module may be interchangeably referred to as a hardware module.

Some features may be stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device. However, the computer readable storage medium is not a transitory transmission medium for propagating signals.

The processing capability of the system may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

The term "user" as used herein refers to a computer account or entity, not an actual person who may be logged in as, and/or perform computer operations via, the user. The spreadsheet or the spreadsheet file may be any file that may be opened by a spreadsheet computer program and whose contents may be displayed by the spreadsheet computer program in columns and rows. The intersection of a column and a row is a cell. Data in the cell may include a value and a data type, such as string, number, or date. The contents may be displayed on one or more sheets by the spreadsheet computer program. For example the sheets may have corresponding tabs or menu items that are user selectable. The spreadsheet and/or data contained in the spreadsheet may be edited by the user through the spreadsheet computer program. Examples of the spreadsheet computer program include Microsoft Excel, LibreOffice Calc, NeoOffice Calc, OpenOffice Calc, Google Sheets, Apple iWork Numbers, and WordPerfect Office Quattro Pro.

Figure 33:
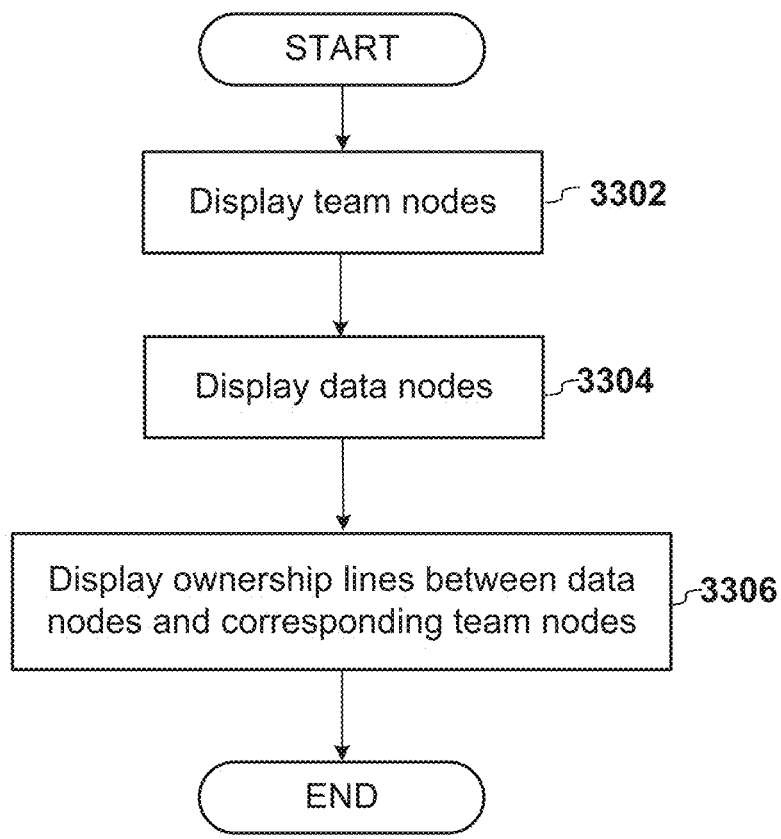
FIG. 33 is a flow diagram showing example logic of a visualization tool module.

FIG. 33 illustrates example logic of the visualization tool module. The logic may include additional, fewer, or different operations than illustrated in FIG. 33.

The team nodes representing the teams may be displayed (3302). Each of the team nodes may correspond to a respective one of the teams. Each of the teams may include at least one respective user. The data nodes representing the data owed by the teams may be displayed (3304). For example, each of the data nodes may represent data such the archive(s) and/or file(s).

The data ownership lines may be displayed (3306). Each of the data ownership lines may connect a respective one of the data nodes to a respective one of the team nodes indicating that data represented by the respective one of the data nodes is owned by the respective one of the team nodes.

Operations may end by, for example, waiting for user input, such as a user selection, to be received from an input device, such as a touch screen, a mouse, and/or a keyboard.

Figure 34:
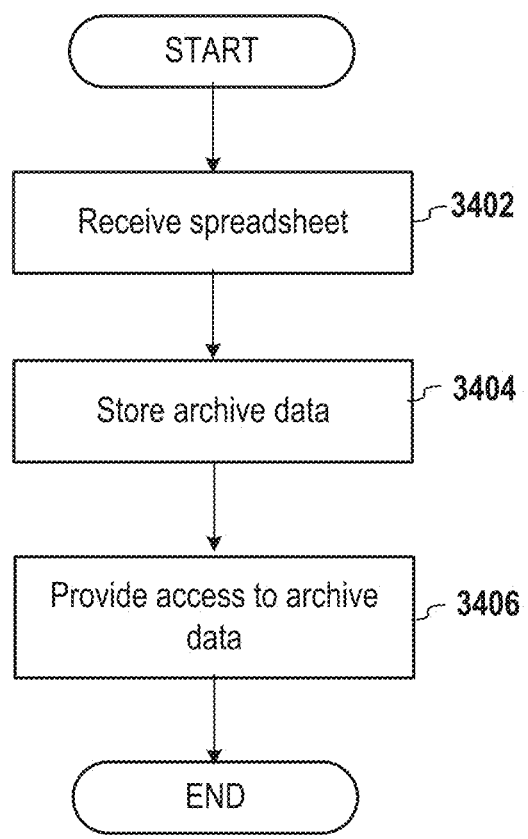
FIG. 34 is a flow diagram showing example logic of an attribute control module.

FIG. 34 illustrates example logic of the attribute control module. The logic may include additional, fewer, or different operations than illustrated in FIG. 34.

A spreadsheet may be received (3402) that comprises a worksheet. The worksheet may include the attribute lookup information and the archive data. The attribute lookup information may include a list of attributes and, for each respective attribute included in the list of attributes, an identity of a cell and/or a row corresponding to the respective attribute, where the cell and/or the row is included in the sheet, and the cell and/or the row comprises a portion of the archive data that includes a data value for the respective attribute.

The archive data may be stored (3404) in the portal database based on the attribute lookup information. For example, the list of attributes in the attribute lookup information identifies attributes of the portal database in which the archive data is stored.

Users may be provided access (3406) to the archive data stored in the portal database. The users that are provided access may be, for example, only members of teams that have been granted access to the archive data.

Operations may end, for example, by waiting to receive a second spreadsheet from which another archive may be created.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A computer readable storage medium comprising instructions executable by a processor, the executable instructions comprising: instructions executable to cause a plurality of team nodes representing a plurality of teams to be displayed, each of the team nodes corresponding to a respective one of the teams, each of the teams comprising at least one respective user; and instructions executable to cause a plurality of data nodes and a plurality of data ownership lines to be displayed, each of the data nodes representing data, each of the data ownership lines connecting a respective one of the data nodes to a respective one of the team nodes indicating that data represented by the respective one of the data nodes is owned by the respective one of the team nodes, wherein team nodes and the data nodes are in a three-dimensional structure displayed on a two-dimensional display device; and instructions executable to cause each of the team nodes that represents a supplier in a supply chain to be displayed as a sphere, which is offset from a central line representing the supply chain, wherein a distance that the sphere is offset from the central line is based on a volume of parts supplied to the supply chain.

2. The computer readable storage medium of claim 1, wherein the teams represented by the team nodes span multiple entities in a supply chain.

3. The computer readable storage medium of claim 1 further comprising instructions executable to cause an icon to be displayed indicative of a delay in a gated workflow.

4. The computer readable storage medium of claim 1 further comprising instructions executable to cause at least one team relationship line to be displayed that indicates a relationship between the teams.

5. A method of generating a graphical user interface, the method comprising:
  displaying a plurality of team nodes representing a plurality of teams, each of the team nodes corresponding to a respective one of the teams, each of the teams comprising at least one respective user;
  displaying a plurality of data nodes and a plurality of data ownership lines, each of the data nodes representing data, each of the data ownership lines connecting a respective one of the data nodes to a respective one of the team nodes indicating that data represented by the respective one of the data nodes is owned by the respective one of the team nodes; and
  displaying an archive node representing at least one data set stored in compliance with attributes shared by two or more of the teams.

6. The method of claim 5 further comprising displaying an access line between a data node included in the data nodes and a team node included in the team nodes, the access line indicating that a team represented by the team node has access to data that is represented by the data node.

7. The method of claim 5 further comprising displaying a user node representing a user and displaying a membership line between the user node and a team node included in the team nodes or between the user node and a members node associated with the team node, the membership line indicating that the user is a member of the team node.

8. The method of claim 5 further comprising displaying a user node representing a user and displaying an accessed line between the user node and a data node that is included in the data nodes, the accessed line indicating that the user represented by the user node has accessed data that is represented by the data node.

9. The method of claim 5 further comprising displaying a list of files comprising data that is represented by a data node in response to detection of a selection of the data node.

10. The method of claim 5 further comprising displaying a list of data sets in response to a selection of archive node.

11. A system comprising:
  a display device; and
  a processor configured to:
    cause a plurality of team nodes representing a plurality of teams to be displayed on the display device, each of the team nodes corresponding to a respective one of the teams, each of the teams comprising at least one respective user;
    cause a plurality of data nodes and a plurality of data ownership lines to be displayed on the display device, each of the data nodes representing data, each of the data ownership lines connecting a respective one of the data nodes to a respective one of the team nodes indicating that data represented by the respective one of the data nodes is owned by the respective one of the team nodes; and
    cause an archive node to be displayed on the display device, the archive node representing at least one data set stored in compliance with attributes shared by two or more of the teams.

12. The system of claim 11 wherein the processor is further configured to cause an access line between a data node included in the data nodes and a team node included in the team nodes to be displayed on the display device, the access line indicating that a team represented by the team node has access to data that is represented by the data node.

13. The system of claim 11 wherein the processor is further configured to cause a plurality of attributes of sharable data owned by a first team to be displayed on the display device in response to a selection by a user from a second team, the first team and the second team are included in the teams.

14. The system of claim 11 wherein the processor is further configured to receive a request for access to a plurality of attributes of sharable data owned by a first team in response to a selection by a user from a second team, the first team and the second team are included in the teams.

15. The system of claim 11 wherein the processor is further configured to cause a list of files comprising data that is represented by a data node to be displayed on the display device in response to detection of a selection of the data node.

\* \* \* \* \*